United States Patent
Kagawa et al.

(10) Patent No.: US 9,623,670 B2
(45) Date of Patent: Apr. 18, 2017

(54) IMAGE PROCESSING APPARATUS AND IMAGE PROCESSING METHOD

(71) Applicant: CANON KABUSHIKI KAISHA, Tokyo (JP)

(72) Inventors: Hidetsugu Kagawa, Kawasaki (JP); Yumi Yanai, Yokohama (JP); Shinjiro Hori, Yokohama (JP); Tetsuya Suwa, Yokohama (JP); Tomokazu Ishikawa, Yokohama (JP); Wakako Tanaka, Inagi (JP); Tohru Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/192,229

(22) Filed: Jun. 24, 2016

(65) Prior Publication Data
US 2017/0001446 A1     Jan. 5, 2017

(30) Foreign Application Priority Data
Jul. 1, 2015 (JP) ................................ 2015-132748

(51) Int. Cl.
*B41J 2/21* (2006.01)
*H04N 1/00* (2006.01)
(Continued)

(52) U.S. Cl.
CPC .............. *B41J 2/2142* (2013.01); *G06K 9/38* (2013.01); *G06K 9/46* (2013.01); *G06K 15/102* (2013.01);
(Continued)

(58) Field of Classification Search
CPC ......... B41J 2/2142; B41J 2/2146; G06K 9/38; G06K 9/46; G06K 15/102; H04N 1/00795; H04N 2201/0094; H04N 1/405
See application file for complete search history.

(56) References Cited

U.S. PATENT DOCUMENTS 8,503,031 B2   8/2013   Kajihara
8,619,319 B2   12/2013  Tsuchiya
(Continued)

FOREIGN PATENT DOCUMENTS

JP   2013-185862   9/2013

OTHER PUBLICATIONS

U.S. Appl. No. 15/191,226, filed Jun. 23, 2016.
(Continued)

*Primary Examiner* — Thinh H Nguyen
(74) *Attorney, Agent, or Firm* — Fitzpatrick, Cella, Harper & Scinto

(57) ABSTRACT

An image processing apparatus has: a setting unit configured to set a division way for dividing an image data; a processing unit configured to divide the image data in accordance with the division way, and perform a predetermined process on each of resulting division areas; and an extracting unit configured to extract a unique portion from the image data. The predetermined process includes an averaging process on each of division areas obtained by dividing the image data in accordance with the division way, a quantization process for quantizing values obtained by the averaging process, and an addition process for adding values obtained by differentiating the division way. The setting unit sets a first division way for the predetermined process for a first area that is associated with the device in occurrence position of the unique portion and a second division way for a second area other than the first area.

19 Claims, 21 Drawing Sheets

(51) Int. Cl.
*G06K 9/46* (2006.01)
*G06K 9/38* (2006.01)
*G06K 15/10* (2006.01)

(52) U.S. Cl.
CPC . *H04N 1/00795* (2013.01); *H04N 2201/0094* (2013.01)

(56) References Cited

U.S. PATENT DOCUMENTS

| | | |
|---|---|---|
| 8,830,530 B2 | 9/2014 | Sano |
| 8,979,238 B2 * | 3/2015 | Nishikori ............... B41J 2/2146 347/14 |
| 9,064,202 B2 | 6/2015 | Tanaka |
| 9,087,291 B2 | 7/2015 | Hori |
| 9,092,720 B2 | 7/2015 | Nakagawa |
| 9,210,292 B2 | 12/2015 | Miyake |
| 2003/0133606 A1 | 7/2003 | Yano |
| 2016/0167414 A1 | 6/2016 | Yanai |
| 2016/0167415 A1 | 6/2016 | Ikeda |
| 2016/0173725 A1 | 6/2016 | Kato |

OTHER PUBLICATIONS

U.S. Appl. No. 14/991,618, filed Jan. 8, 2016.
U.S. Appl. No. 15/192,216, filed Jun. 24, 2016.
U.S. Appl. No. 15/191,210, filed Jun. 23, 2016.
U.S. Appl. No. 15/192,243, filed Jun. 24, 2016.
U.S. Appl. No. 15/191,241, filed Jun. 23, 2016.
Kizuki, "Algorithm inspired by Peripheral Vision and Involuntary Eye Movement", Journal of the Japan Society for Precision Engineering, vol. 79, No. 11, 2013, p. 1045-1049.

* cited by examiner

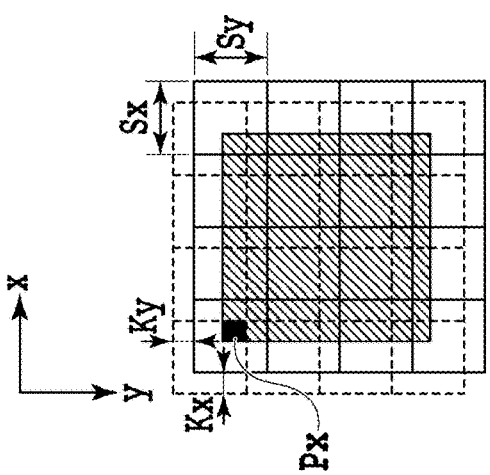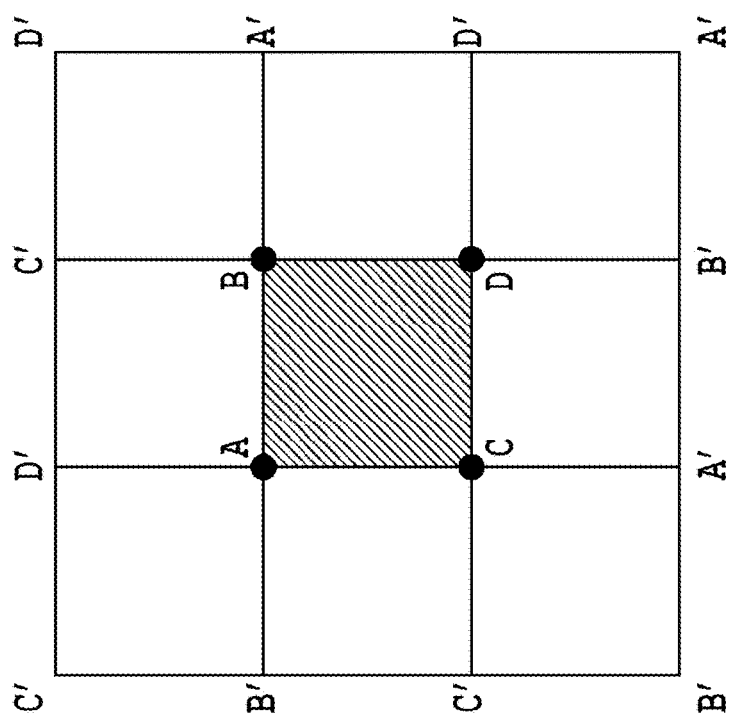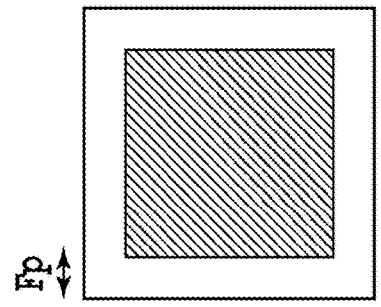

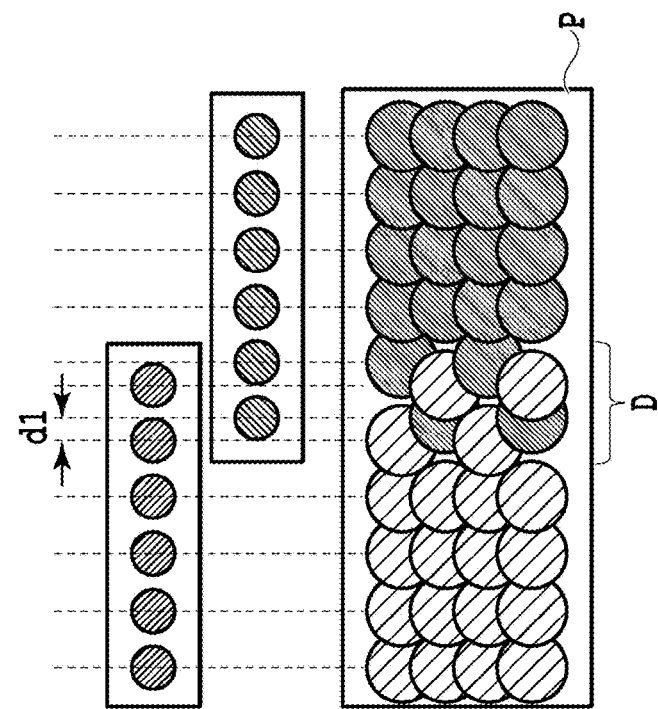
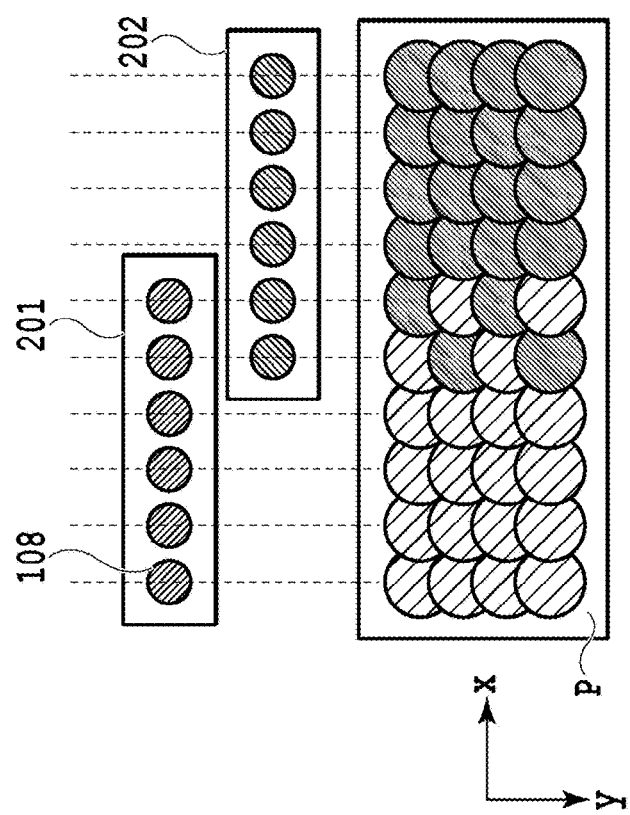
FIG.11A
FIG.11B

IMAGE PROCESSING APPARATUS AND IMAGE PROCESSING METHOD

BACKGROUND OF THE INVENTION

Field of the Invention

The present invention relates to an image processing apparatus and image processing method adapted to extract a defect (unique portion) of an inspection target.

Description of the Related Art

Japanese Patent Laid-Open No. 2013-185862 or ""KIZUKI" Algorithm inspired by Peripheral Vision and Involuntary Eye Movement", Journal of the Japan Society for Precision Engineering, Vol. 79, No. 11, 2013, p. 1045-1049 discloses an algorism for detecting a defect of an inspection target in accordance with a human visual mechanism. Specifically, after imaging an inspection target, the resulting image is divided into division areas having a predetermined size, and averaging and quantization are performed for each of the division areas. In addition, under multiple sets of conditions determined by changing the size and/or phase of a division area, such a process is performed, and from a result of adding the resulting quantized values, the presence or absence of a defect is determined, and if present, the size of the defect is also determined. By employing such a method, a defect of an inspection target can be efficiently extracted and/or made apparent without any human observation.

When employing the algorithm disclosed in Japanese Patent Laid-Open No. 2013-185862 or the above-described Journal of the Japan Society for Precision Engineering, in order to effectively detect a defect portion (unique portion), it is preferable to adjust various parameters such as a division size and a phase used for an image process. For example, when in order to detect a stripe or unevenness specific to an inkjet printing apparatus, using the above-describe algorithm to inspect an image printed by the printing apparatus, a division size range and a phase range for suitably detecting the stripe or unevenness change depending on the features of the stripe or unevenness. In addition, when such parameters are not properly adjusted, the defect portion may be unextractable, or a load on and time for the extracting process may be uselessly increased.

However, in Japanese Patent Laid-Open No. 2013-185862 or the above-described Journal of the Japan Society for Precision Engineering, the correspondence relationship between the features of a defect to be extracted and parameters suitable for the defect extraction has not been referred to at all.

SUMMARY OF THE INVENTION

The present invention is made in order to solve the above-described problem. Accordingly, an object of the present invention is to provide an image processing apparatus that despite employing the algorithm disclosed in Japanese Patent Laid-Open No. 2013-185862 or the above-described Journal of the Japan Society for Precision Engineering, by setting parameters suitable for the features of a unique portion to be extracted, can effectively detect the unique portion of a printed image.

According to a first aspect of the present invention, there is provided an image processing apparatus adapted to inspect an image, the image processing apparatus comprising: an acquisition unit configured to acquire image data obtained by reading the image; a setting unit configured to set a division way for dividing the image data; a processing unit configured to divide the image data in accordance with the division way set by the setting unit, and perform a predetermined process on each of resulting division areas; and an extracting unit configured to extract a unique portion caused by a device to print the image from image data resulting from performing the predetermined process, wherein the predetermined process includes an averaging process on each of division areas obtained by dividing the image data in accordance with the division way set by the setting unit, a quantization process for quantizing values obtained by the averaging process, and an addition process for adding values obtained by differentiating the division way of the image data in the averaging process and performing the quantization process, and the setting unit sets a first division way for the predetermined process for a first area that is associated with the device in occurrence position of the unique portion and a second division way for a second area other than the first area.

According to a second aspect of the present invention, there is provided an image processing apparatus adapted to inspect an image, the image processing apparatus comprising: an acquisition unit configured to acquire image data obtained by reading the image; a setting unit configured to set a file parameter for performing a filtering process on the image data; a processing unit configured to perform a predetermined process on the image data in accordance with the file parameter set by the setting unit; and an extracting unit configured to extract a unique portion caused by a device to print the image from image data resulting from performing the predetermined process, wherein the predetermined process includes the filtering process in accordance with the file parameter set by the setting unit, a quantization process for quantizing values obtained by the filtering process, and an addition process for adding values obtained by differentiating the file parameter in the filtering process and performing the quantization process, and the setting unit sets a first file parameter for the predetermined process for a first area that is associated with the device in occurrence position of the unique portion and a second file parameter for a second area other than the first area independently.

According to a third aspect of the present invention, there is provided an image processing method adapted to inspect an image, the image processing method comprising: an acquisition step of acquiring image data obtained by reading the image; a setting step of setting a division way for dividing the image data; a processing step of dividing the image data in accordance with the division way set in the setting step, and performing a predetermined process on each of resulting division areas; and an extracting step of extracting a unique portion caused by a device to print the image from image data resulting from performing the predetermined process, wherein the predetermined process includes an averaging process on each of division areas obtained by dividing the image data in accordance with the division way set by the setting step, a quantization process for quantizing values obtained by the averaging process, and an addition process for adding values obtained by differentiating the division way of the image data in the averaging process and performing the quantization process, and in the setting step, a first division way for the predetermined process for a first area that is associated with the device in occurrence position of the unique portion and a second division way for a second area other than the first area are set independently.

According to a fourth aspect of the present invention, there is provided an image processing method adapted to inspect an image, the image processing method comprising:

an acquisition step of acquiring image data obtained by reading the image; a setting step of setting a file parameter for performing a filtering process on the image data; a processing step of performing a predetermined process on the image data in accordance with the file parameter set in the setting step; and an extracting step of extracting a unique portion caused by a device to print the image from image data resulting from performing the predetermined process, wherein the predetermined process includes the filtering process in accordance with the file parameter set by the setting step, a quantization process for quantizing values obtained by the filtering process, and an addition process for adding values obtained by differentiating the file parameter in the filtering process and performing the quantization process, and in the setting step, a first file parameter for the predetermined process for a first area that is associated with the device in occurrence position of the unique portion and a second file parameter for a second area other than the first area are set independently.

Further features of the present invention will become apparent from the following description of exemplary embodiments (with reference to the attached drawings).

BRIEF DESCRIPTION OF THE DRAWINGS

FIGS. 10A to 10C are diagrams for explaining a method for generating dummy data;

FIGS. 11A and 11B are diagrams illustrating print states near overlap areas, respectively;

DESCRIPTION OF THE EMBODIMENTS

FIGS. 1A to 1D are diagrams illustrating examples of a form of an image processing apparatus 1 usable in the present invention. An image processing apparatus of the present invention is one that on imaged image data, performs a popup process for allowing a user to easily recognize unique portions as candidates for a unique portion of a printed image and a process for allowing the apparatus itself to make a determination, and as a system, can take various forms.

Figure 1A:
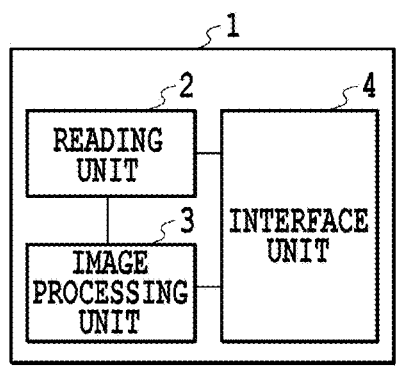
FIGS. 1A to 1D are diagrams illustrating examples of a form of an image processing apparatus usable in the present invention.

FIG. 1A illustrates a form in which the image processing apparatus 1 includes a reading unit 2. For example, a sheet on which a predetermined image is printed by an inkjet printing apparatus is placed on a reading table of the reading unit 2 inside the image processing apparatus 1 and imaged by an optical sensor or the like, and the resulting image data is transmitted to an image processing unit 3. The image processing unit 3 includes a CPU or an image processing accelerator capable of higher speed processing than the CPU, and controls a reading action by the reading unit 2 or performs a predetermined inspection process on the received image data.

Figure 1B:
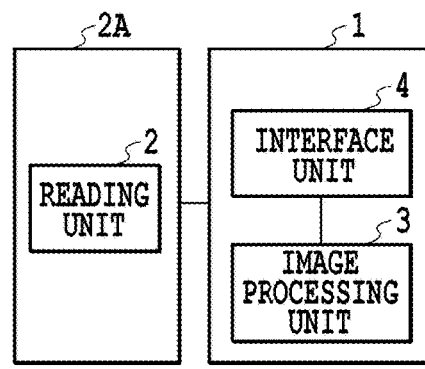

FIG. 1B illustrates a form in which the image processing apparatus 1 is externally connected to a reading apparatus 2A including a reading unit 2. For example, this form corresponds to a system in which a PC is connected to a scanner. As a method for the connection, a general connecting method such as USB, GigE, or CameraLink can be used. Image data read by the reading unit 2 is provided to an image processing unit 3 through an interface 4, and the image processing unit 3 performs a predetermined inspection process on the received image data. Note that in this form, the image processing apparatus 1 may be further externally connected to a printing apparatus 5A including a printing unit 5.

Figure 1C:
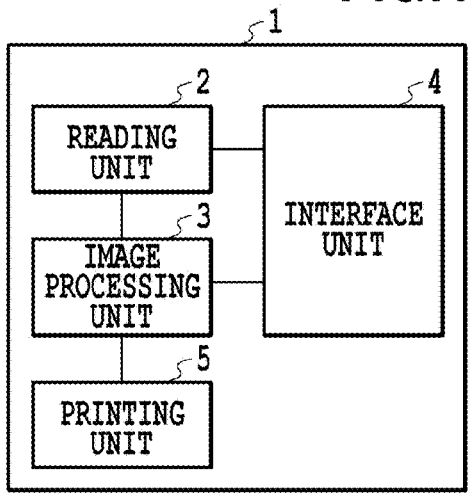

FIG. 1C illustrates a form in which the image processing apparatus 1 includes a reading unit 2 and a printing unit 5. For example, this form corresponds to a multifunction peripheral having all of a scanner function, a printer function, and an image processing function. An image processing unit 3 controls all of a printing action in the printing unit 5, a reading action in the reading unit 2, an inspection process to be performed on an image read by the reading unit 2, and other actions and processes.

Figure 1D:
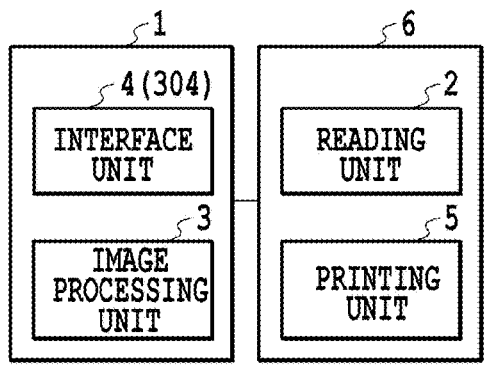

FIG. 1D illustrates a form in which the image processing apparatus 1 is externally connected to a multifunction peripheral 6 including a reading unit 2 and a printing unit 5. For example, this form corresponds to a system in which a PC is connected to a multifunction peripheral having both of a scanner function and a printer function.

The image processing apparatus 1 of the present invention can employ any of the forms in FIGS. 1A to 1D. In the following, embodiments of the present invention will be described in detail while taking the case of employing the form in FIG. 1D as an example.

First Embodiment

Figure 2:
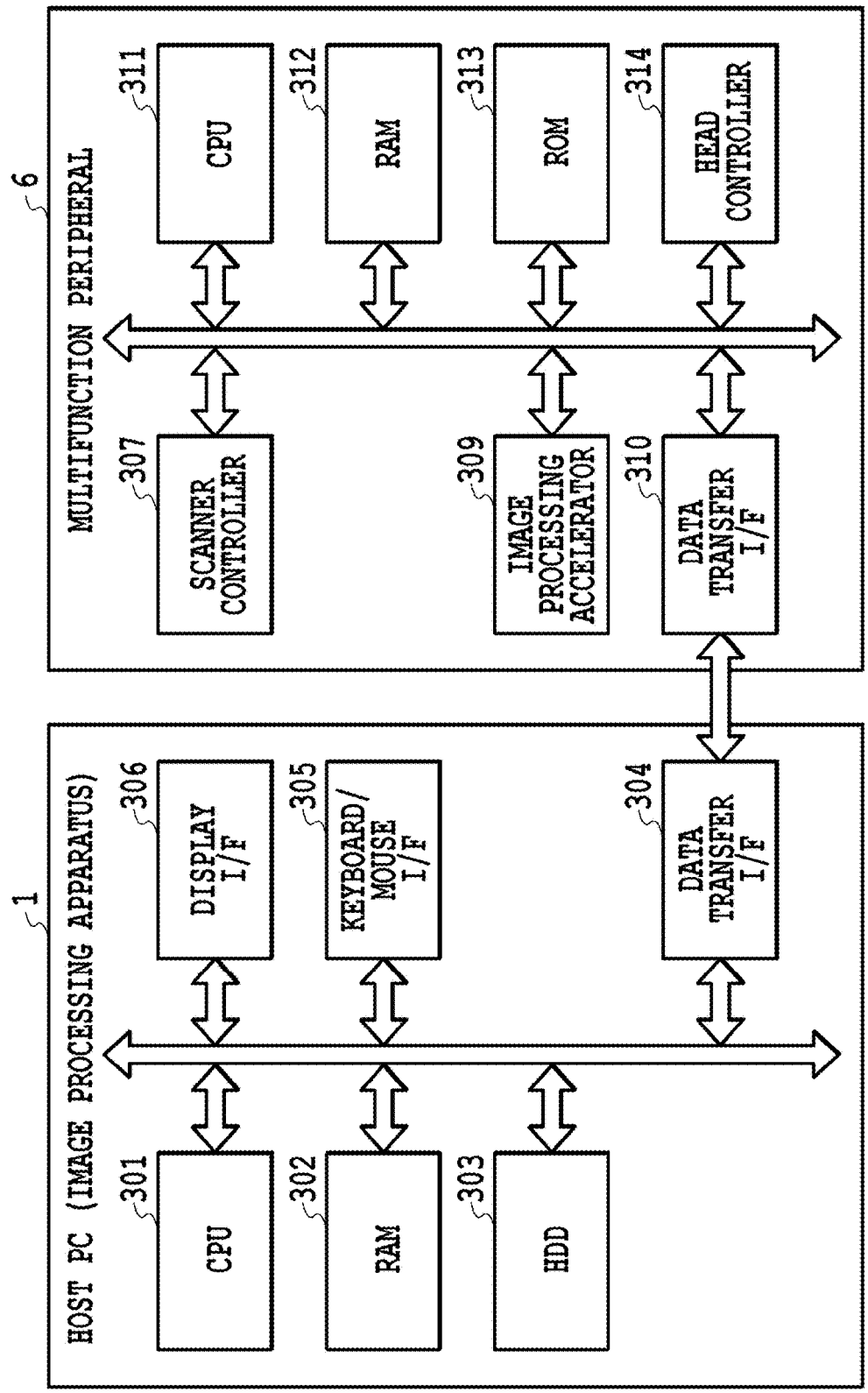
FIG. 2 is a block diagram for explaining a control configuration in an image processing system.

FIG. 2 is a block diagram for explaining a control configuration in the form of FIG. 1D. The image processing apparatus 1 is made up of a host PC and the like, in which a CPU 301 performs various processes in accordance with programs held in an HDD 303 while using a RAM 302 as a work area. For example, the CPU 301 generates image data printable by the multifunction peripheral 6 in accordance with a command received from a user through a keyboard/mouse I/F 305 or a program held in the HDD 303, and transfers the image data to the multifunction peripheral 6. Also, the CPU 301 performs a predetermined process on image data received from the multifunction peripheral 6 through a data transfer I/F 304 in accordance with a program stored in the HDD, and displays a result of the process or various pieces of information on an unillustrated display through a display I/F 306.

On the other hand, in the multifunction peripheral 6, a CPU 311 performs various processes in accordance with programs held in a ROM 313 while using a RAM 312 as a work area. In addition, the multifunction peripheral 6 includes: an image processing accelerator 309 for performing a high-speed image process; a scanner controller 307 for controlling the reading unit 2; and a print head controller 314 for controlling the printing unit 5.

The image processing accelerator 309 is hardware adapted to be able to perform an image process at higher speed than the CPU 311. Also, the CPU 311 writes parameters and data necessary for the image process into a predetermined address of the RAM 312, and thereby the image processing accelerator 309 is activated, and after reading the parameters and data, performs the predetermined image process on the data. Note that the image processing accelerator 309 is not an indispensable component, and the CPU 311 can perform an equivalent process.

The head controller 314 supplies print data to a print head 100 provided in the printing unit 5 as well as controlling the printing action of the print head 100. Also, the CPU 311 writes print data printable by the print head 100 and control parameters into a predetermined address of the RAM 312, and thereby the head controller 314 is activated, and performs an ejecting action in accordance with the print data.

The scanner controller 307 controls individual reading elements arrayed in the reading unit 2 and at the same time, outputs RGB luminance data obtained from the reading elements to the CPU 311. The CPU 311 transfers the obtained RGB luminance data to the image processing apparatus 1 through a data transfer I/F 310.

As a method for the connection between the data transfer I/F 304 of the image processing apparatus 1 and the data transfer I/F 310 of the multifunction peripheral 6, a method such as USB, IEEE 1394, or LAN can be used.

Figure 3:
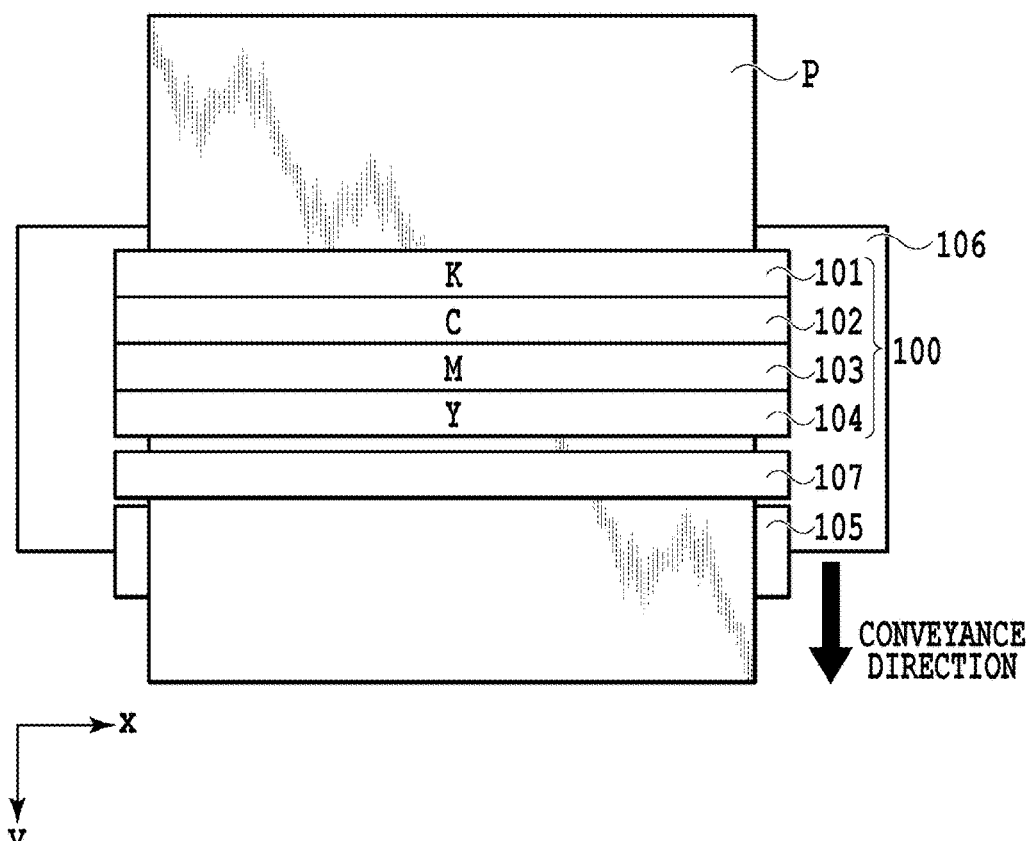
FIG. 3 is a schematic configuration diagram of an inkjet printing apparatus as a multifunction peripheral usable in the present invention.

FIG. 3 is a schematic configuration diagram of an inkjet printing apparatus (hereinafter also simply referred to as a printing apparatus) usable as the multifunction peripheral 6 in the present embodiment. The printing apparatus in the present embodiment is a full-line type printing apparatus, in which the print head 100 and a read head 107 both having the same width as that of a sheet P are parallel arranged. The print head 100 includes four printing element arrays 101 to 104 respectively adapted to eject black (K), cyan (C), magenta (M), and yellow (Y) inks, and these printing element arrays 101 to 104 are parallel arranged in a conveyance direction of the sheet P (Y direction). Further, downstream of the printing element arrays 101 to 104, the read head 107 is disposed. In the read head 107, multiple reading elements for reading a printed image are arrayed in an X direction.

When performing a printing process or a reading process, the sheet P is conveyed in the Y direction of the diagram at a predetermined speed along with the rotation of a conveyance roller 105, and during the conveyance, the printing process by the print head 100 and the reading process by the read head 107 are performed. The sheet P in a position where the printing process by the print head 100 or the reading process by the read head 107 is performed is supported from below by a flat plate-shaped platen 106, and thereby the distances from the print head 100 and the read head 107, and smoothness are kept.

Figure 4A:
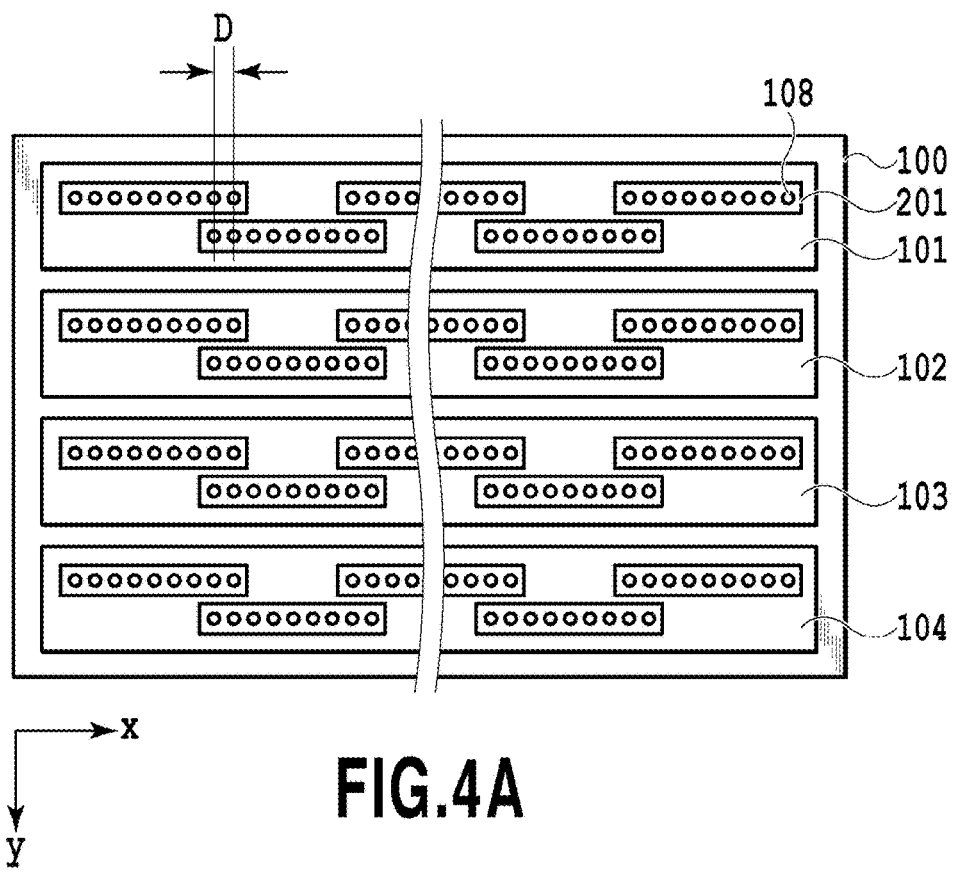
FIGS. 4A and 4B are diagrams illustrating the array configurations of printing elements and reading elements, respectively.
Figure 4B:
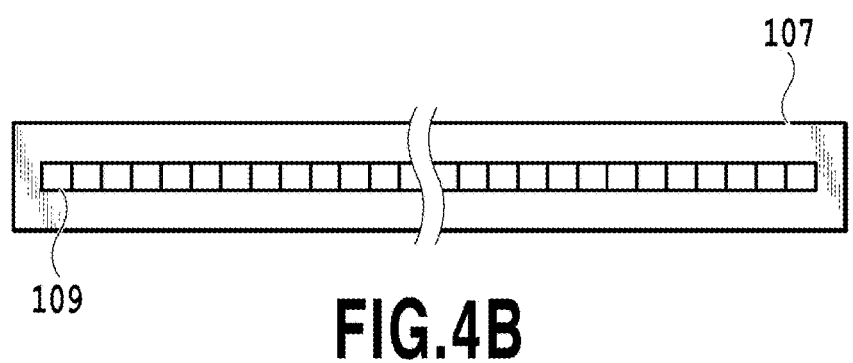

FIGS. 4A and 4B are diagrams illustrating the array configuration of the printing elements in the print head 100 and the array configuration of the reading elements in the read head 107, respectively. In the print head 100, in each of the printing element arrays 101 to 104 corresponding to the respective ink colors, multiple printing element substrates 201 each on which multiple printing elements 108 are arrayed at constant pitches are arranged continuously in the X direction and alternately in the Y direction with overlap areas D provided. Individual printing elements 108 eject corresponding inks at a constant frequency in accordance with print data onto a sheet P conveyed in the Y direction at the constant speed, and thereby an image having a resolution corresponding to the array pitch of the printing elements 108 is printed on the sheet P.

On the other hand, in the read head 107, multiple reading sensors 109 are arrayed in the X direction at predetermined pitches. The individual reading sensors 109 image at a predetermined frequency an image on a sheet P conveyed in the Y direction at the constant speed, and thereby the entire image printed on the sheet P can be read at the array pitches between any adjacent reading elements arrayed in the reading sensors 109.

In the following, a unique portion detecting algorithm in the present embodiment will be specifically describe. The unique portion detecting algorithm in the present embodiment is an algorithm for imaging an already printed image, and performing a predetermined image process on the resulting image data. An apparatus for printing an image is not necessarily required to be the inkjet printing apparatus as the multifunction peripheral 6. However, in the following, the case where an image printed by the print head 100 of the multifunction peripheral 6 is read by the read head 107 will be described.

Figure 5:
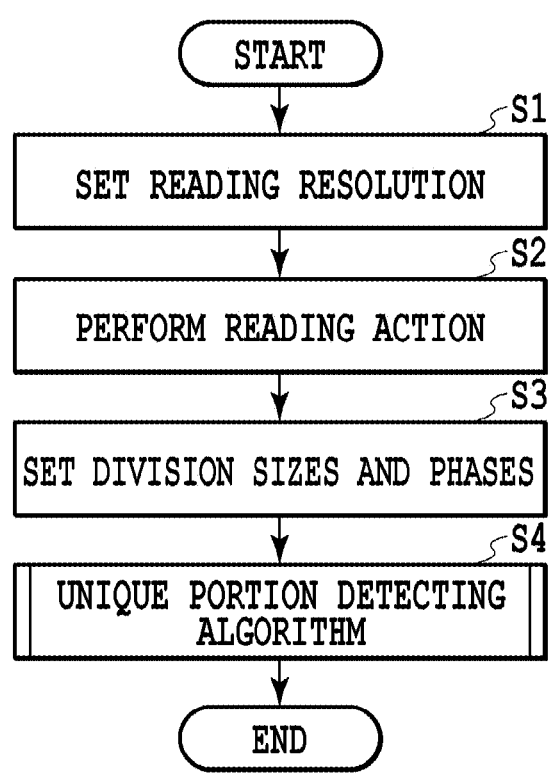
FIG. 5 is a flowchart illustrating the basic steps for unique portion detection in a first embodiment.

FIG. 5 is a flowchart for explaining the basic steps for unique portion detection performed by the image processing apparatus 1 of the present embodiment. When this process is started, the image processing apparatus 1 sets a reading resolution in Step S1. In subsequent Step S2, in accordance with the reading resolution set in Step S1, the reading action is performed on an image as an inspection target. That is, by driving the scanner controller 307, output signals from the multiple reading elements arrayed in the reading sensors 109 are obtained, and on the basis of the output signals, image data having the reading resolution set in Step S1 is generated. In the present embodiment, image data is defined as including R, G, and B luminance signals.

In Step S3, the CPU 301 sets a division size and a phase to be used for the unique portion detecting algorithm in subsequent Step S4. In Step S3, at least one or more division sizes and at least one or more phases are set. The definitions of the division size and the phase will be described later in detail. In Step s4, on the basis of the division sizes and the phases set in Step S3, the unique portion detecting algorithm is performed on the image data generated in Step S2.

Figure 6:
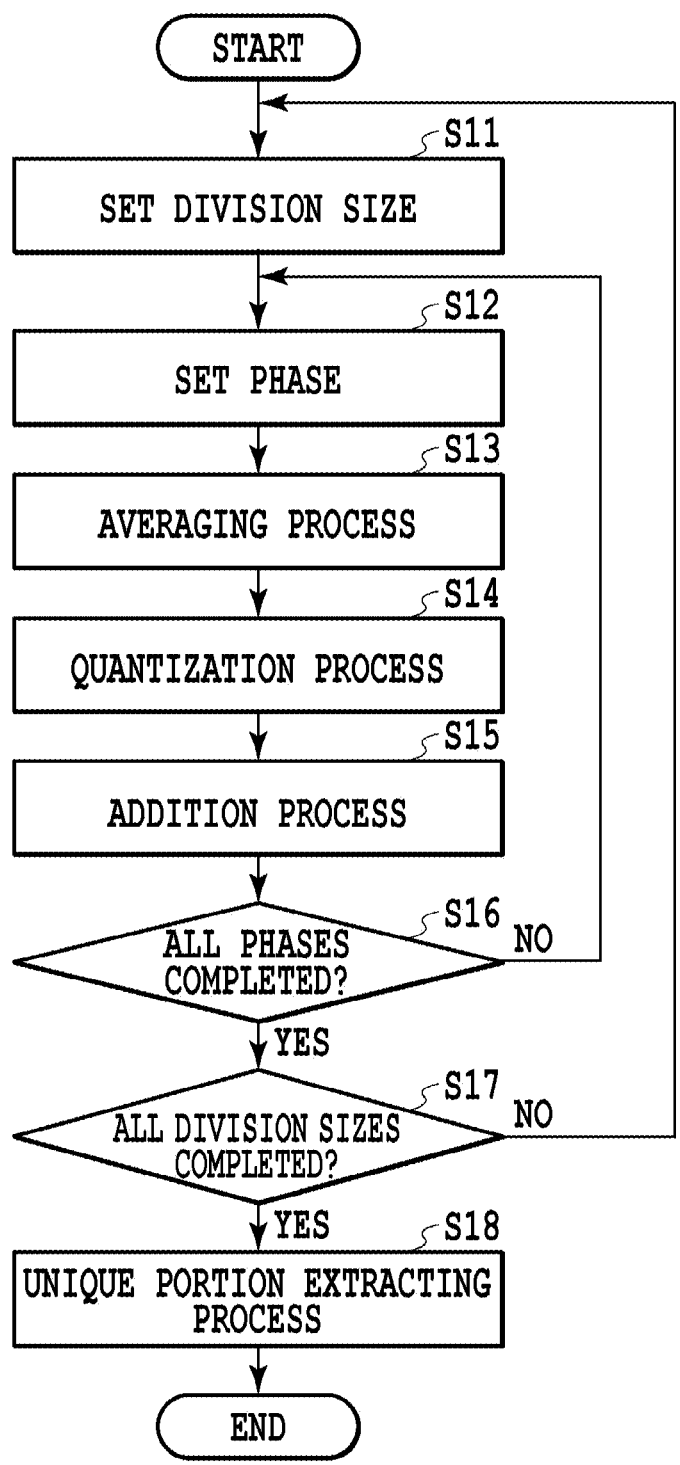
FIG. 6 is a flowchart illustrating a unique portion detecting algorithm in the first embodiment.

FIG. 6 is a flowchart for explaining the steps of the unique portion detecting algorithm performed by the CPU 301 in Step S4. When this process is started, in Step S11, the CPU 301 first sets one division size from among the multiple division sizes set in Step S3. In a case where only one division size was set in Step 3, Step 11 is omitted. Further, in Step S12, the CPU 301 sets one phase from among the multiple phases set in Step S3. In a case where only one phase was set in Step 3, Step 12 is omitted. Then, in Step S13, on the basis of the division size set in Step S11 and the phase set in Step S12, the image data acquired in Step S2 is divided to perform an averaging process.

Figure 7A:
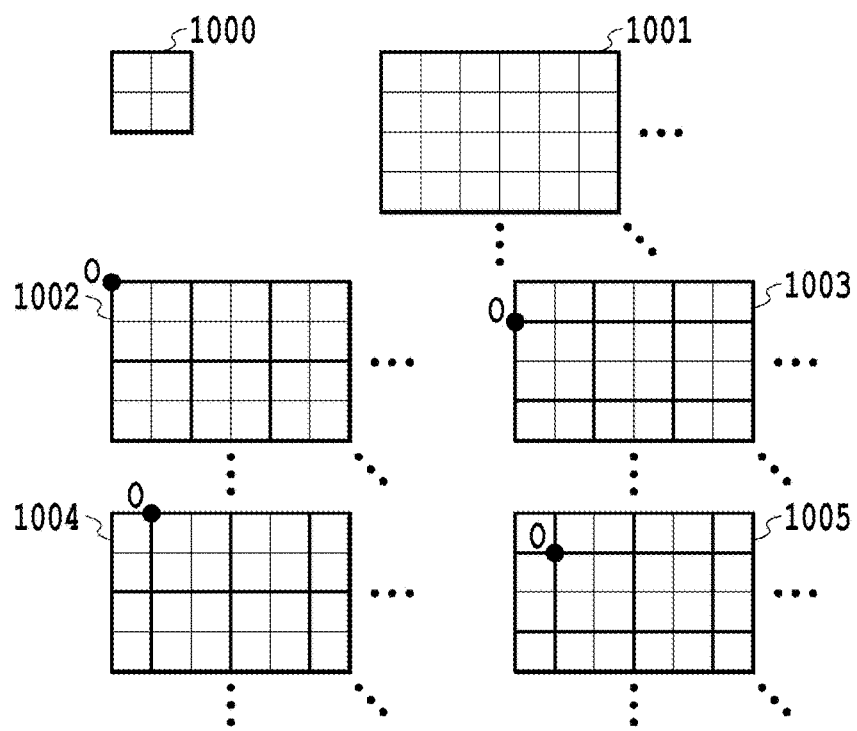
FIGS. 7A and 7B are diagrams for explaining image data division states.
Figure 7B:
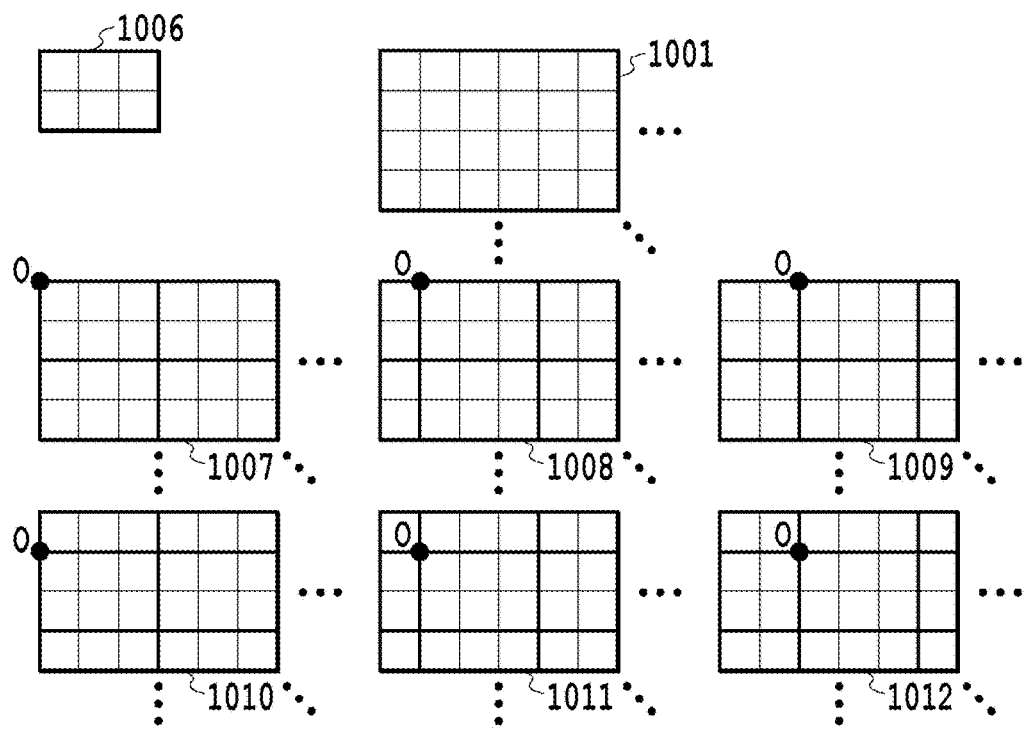
Figure 8A:
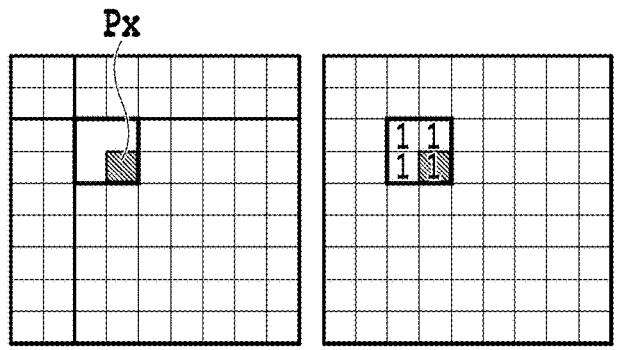
FIGS. 8A to 8E are diagrams schematically illustrating the steps of an addition process performed in the case of a division size of 2×2 pixels.
Figure 8B:
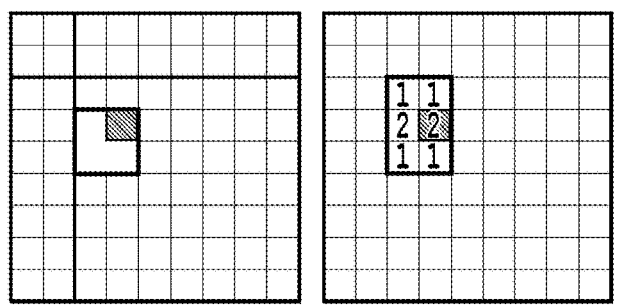
Figure 8C:
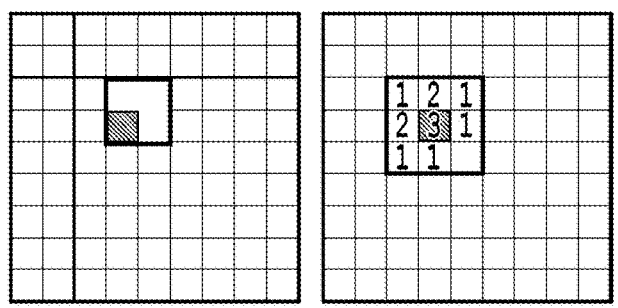
Figure 8D:
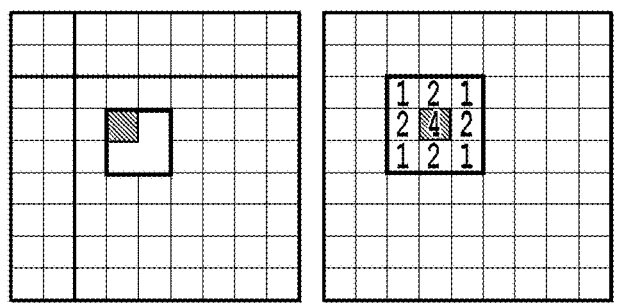
Figure 8E:
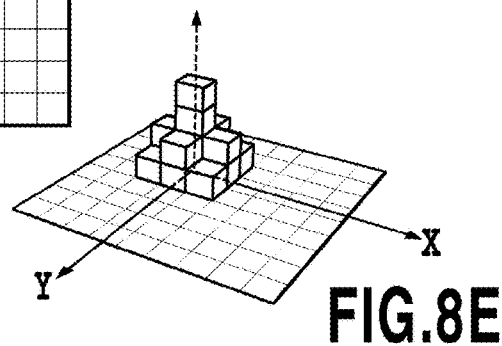
Figure 9A:
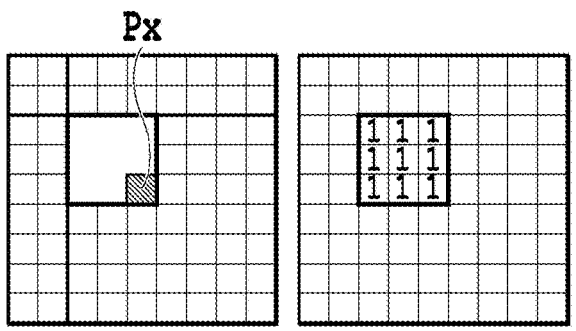
FIGS. 9A to 9J are diagrams schematically illustrating the steps of the addition process performed in the case of a division size of 3×3 pixels.
Figure 9B:
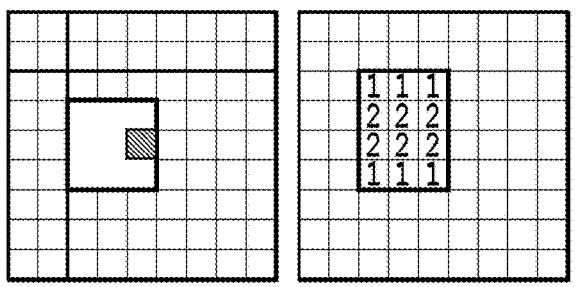
Figure 9C:
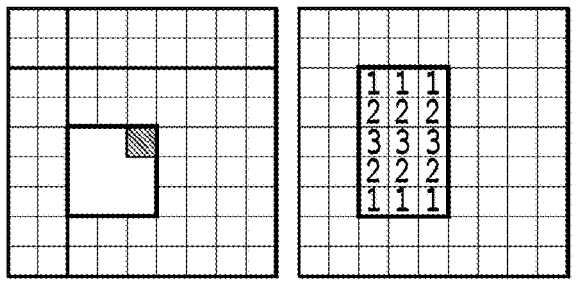
Figure 9D:
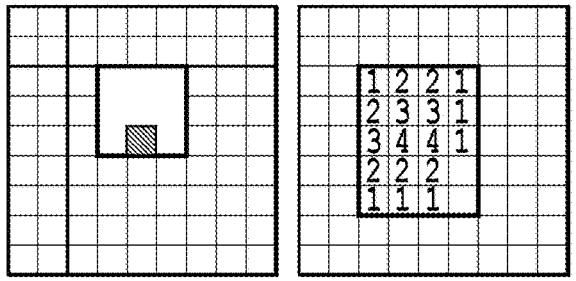
Figure 9E:
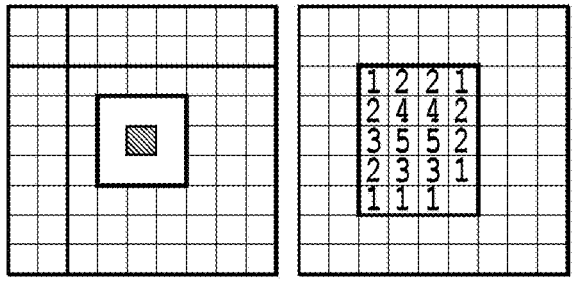
Figure 9F:
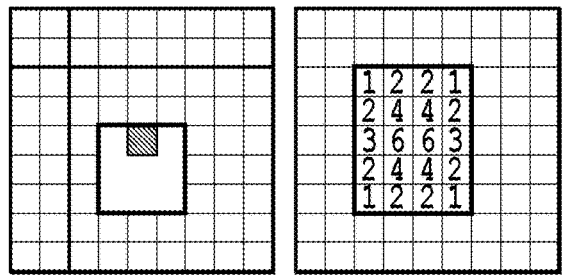
Figure 9G:
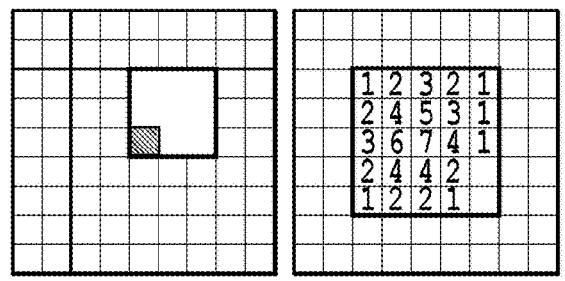
Figure 9H:
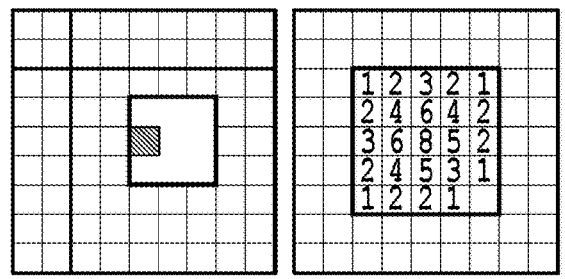
Figure 9I:
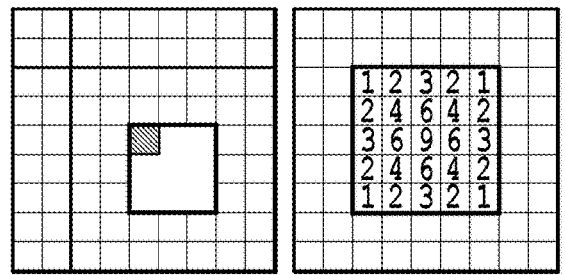
Figure 9J:
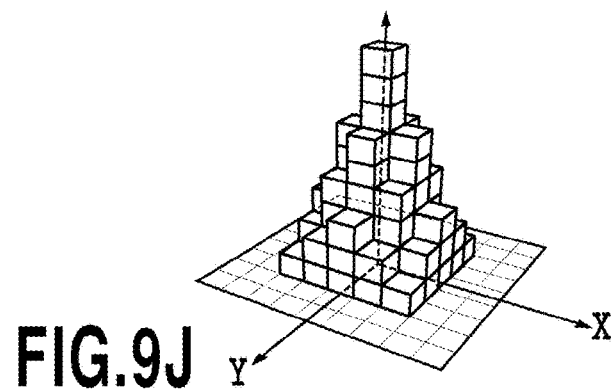

FIGS. 7A and 7B are diagrams for explaining image data division states based on a division size and a phase. FIG. 7A illustrates the case where the division size is set to 2×2 pixels, and FIG. 7B illustrates the case where the division size is set to 3×2 pixels. In the case where the division size 1000 is set to 2×2 pixels as in FIG. 7A, an image data area 1001 is divided on a 2×2 pixel basis, and can be divided in four different ways as indicated by 1002 to 1005. As described, the phase can be considered as indicating the origin O of a designated division size. In the case where the division size 1006 is set to 3×2 pixels as in FIG. 7B, the image data area 1001 can be divided in six different ways as indicated by 1007 to 1012, meaning that six different phases are present.

As the division size is increased, the number of settable phases also increases; however, it is not necessarily required to set all phases for one division size. It is only necessary to set at least one or more phases from among settable phases in Step S3 of FIG. 5, and in Step S12 of FIG. 6, set one of the several phases set in Step S3.

Returning to FIG. 6, in Step S13, the averaging process is performed for each of division areas obtained by the division in Step S12. Specifically, an average value of pieces of luminance data of multiple pixels included in each of the division areas is obtained. When doing this, luminance data of each of the pixels may have a value obtained by directly adding pieces of RGB luminance data of that pixel, or by multiplying the pieces of RGB luminance data respectively by weighting coefficients in a ratio of 3:6:1 and then adding the pieces of weighted data. Also, only a G component may be directly used as the luminance data. Further, a value to be calculated is not necessarily an average value but may be a median value.

In Step S14, the average value calculated in Step S13 is quantized on a pixel basis. The quantization may be binarization or multivalued quantization into several levels. In the case of the binarization, a threshold value for the binarization can be, for example, the intermediate value in a histogram created from average values respectively obtained for the multiple division areas. Also, when desiring to extract only a particularly bright unique portion such as a white stripe, the threshold value can be set to a value approximately 0.9 times the maximum luminance value in the above histogram, whereas when desiring to extract only a particularly dark unique portion, the threshold value can be set to a value approximately 1.1 times the minimum luminance value in the above histogram. In any case, quantized data in a state where quantized values of respective pixels are uniform within each of the division areas is obtained by the above-described quantization process.

In Step S15, the quantized values obtained in Step S14 are added to addition image data. The addition image data refers to image data indicating a result of adding pieces of quantized data obtained in a state of variously changing the division size and the phase. When the quantized data obtained in Step S14 is based on the initial phase corresponding to the initial division size, the addition image data obtained in Step S15 is the same as the quantized data obtained in Step S14.

In subsequent Step S16, the image processing apparatus 1 determines whether or not all phases corresponding to a currently set division size have been processed. When the image processing apparatus 1 determines that a phase to be processed still remains, the flow returns to Step S12, where the next phase is set. On the other hand, when the image processing apparatus 1 determines that all the phases have been processed or only one phase is set in Step S3 for the corresponding division size, the flow proceeds to Step S17.

FIGS. 8A to 8E are diagrams schematically illustrating the steps of the addition process in Step S15, which are sequentially performed for all phases corresponding to a division size of 2×2 pixels. In the diagrams, in the process of sequentially changing four different phases, the number of times of using luminance data of a peripheral pixel in order to perform the addition process with respect to a target pixel Px is indicated on a pixel basis. Also, FIGS. 9A to 9J are diagrams schematically illustrating the steps of the addition process in Step S15, which are sequentially performed for all phases corresponding to a division size of 3×3 pixels. In the process of sequentially changing nine different phases, the number of times of using luminance data of a peripheral pixel in order to perform the addition process with respect to a target pixel Px is indicated on a pixel basis.

In any of the diagrams, the target pixel Px has the largest number of additions because the target pixel Px itself is used in all phases included in a division area, and has the largest contribution to an addition result. A pixel more distant from the target pixel Px has a smaller number of additions, and has a smaller contribution to the addition result. That is, a final result obtained is such that a filtering process is performed with the target pixel as the center.

Returning to the flowchart in FIG. 6, in Step S17, the image processing apparatus 1 determines whether or not all the division sizes set in Step S3 have been processed. When the image processing apparatus 1 determines that a division size to be processed still remains, the flow returns to Step S11, where the next division size is set. On the other hand, when the image processing apparatus 1 determines that all the division sizes have been processed or only one division size is set in Step 3, the flow proceeds to Step S18.

In Step S18, a process for extracting unique portions as candidates for a unique portion is performed on the basis of currently obtained addition image data. A method for the extracting process is not particularly limited. As the method, a publicly known determination processing method can be used, such as a method adapted to, as a unique portion, extract a spot where a variation in signal value is large as compared with pieces of peripheral luminance data. This process ends here.

Meanwhile, for the unique portion detecting algorithm described with FIG. 6, addition data is calculatede on the basis of the average value among all pixels included in a division area that moves around a target pixel Px as described with FIGS. 8A to 9J. For this reason, a pixel positioned in an end part of an image as an inspection target may not be properly processed because a division area includes an area where no data is present. In order to respond to such a situation, in the present embodiment, dummy image data is attached in advance around image data as an inspection target.

FIGS. 10A to 10C are diagrams for explaining a method for generating dummy data. In each of the diagrams, an area corresponding to image data as an inspection target is indicated as a shaded area. As illustrated in FIG. 10A, when a target pixel Px indicated in black is positioned at a corner of the inspection target area, a division area (solid line)

around the target pixel Px, and a division area (dashed line) having a phase shifted from that of the former respectively include areas (white areas) where no data is present. For this reason, in the present embodiment, dummy data is generated such that even when using the maximum division size to set the maximum movement distance with respect to the target pixel Px, appropriate data is present in any pixel included in a division area.

FIG. 10B is a diagram illustrating the method for generating dummy data. Four images obtained by inverting inspection target image data point-symmetrically with respect to apices A, B, C, and D, respectively, and four images obtained by inverting the inspection target image data line-symmetrically with respect to sides AB, BC, CD, and DA, respectively are generated, and these eight images surround the inspection target image data. It is here assumed that for example, the maximum division size and the maximum movement distance in the unique portion detecting algorithm are respectively represented by (Sx, Sy) and (Kx, Ky). In this case, the dummy data is only required to be generated in an area that is extended from the four edges of the inspection target image data by Fp=(Sx/2)+Kx in the ±X directions and by Fq=(Sy/2)+Ky in the ±Y directions. FIG. 10C illustrates the inspection target image data that is added with the dummy data in this manner. Using such an inspection target image data to perform the above-described unique portion detecting algorithm makes it possible to obtain a desired result over the entire area of an inspection target image.

Note that information on a unique portion extracted in accordance with the above-described algorithm can then be used for various applications. For example, when inspecting a unique portion of an image, the unique portion may be displayed as popup in order that an inspector can determine the unique portion easily. In this case, the inspector can confirm the unique portion on the basis of a popup image, and repair the defect portion or eliminate the image as a defective image.

Further, in the case of a product having a function of correcting a defect to a normal state, the information on the unique portion can be set so as to be usable for a correction process. For example, this corresponds to the case of detecting whether or not ejection failure is present in the inkjet printing apparatus and if present, performing a maintenance process on the print head for a printing element at a relevant position. Also, when an area where luminance is high or low as compared with surrounding areas is extracted, an image processing parameter for correction can be prepared for that area.

Further, when the printing action by the print head 100, the reading action by the read head 107, and the above-described unique portion detecting algorithm are simultaneously in progress with respect to the same sheet, it may be adapted to notify the occurrence of a defect as an error or suspend the printing action.

In any case, as long as employing the above-described unique portion detecting algorithm, since a unique portion is extracted on the basis of the addition of pieces of quantized data obtained in a state of variously changing the division size and the phase, a substantial unique portion can be made apparent while suppressing noise caused by each read pixel to an appropriate level.

Meanwhile, as a result of intensive examination, the present inventors have determined that when the features of a unique portion as a detecting target are clear, it is effective to adjust the division size and/or the phase depending on the features. Conversely, there has been the possibility that when the division size and/or the phase are not set within appropriate ranges, respectively, a unique portion cannot be effectively detected or a load on and time for the extracting process are uselessly increased. For this reason, in the present embodiment, in consideration of the features of a unique portion as a detecting target, in Step S3 of the flowchart in FIG. 6, the division sizes and corresponding phases suitable for the features are set. In the following, the relationship between the features of a unique portion as a detecting target in the present invention and the division sizes and corresponding phases suitable for the features will be specifically described.

(Feature Matters)

First, a unique portion of an inspection image as an inspection target in the present embodiment will be described. FIGS. 11A and 11B are diagrams for explaining the vicinity of the overlap area D between printing element arrays described with FIG. 4A and a print state on a sheet caused by the area D. Each of the diagrams illustrates a state where two printing elements of each of the printing element substrates 201 and 202 are included in the overlap area. In areas other than the overlap area, an area having one pixel width and extending in the Y direction is printed with dots by one printing element. On the other hand, in the overlap area D, an area having one pixel width and extending in the Y direction is printed with dots alternately by two printing elements respectively arranged in the different printing element substrates.

When laying out the printing element substrates as in FIG. 4A at the time of manufacturing the print head, an attachment error may occur. Also, as the temperature of the print head increases, the printing element substrates may expand. In any of these cases, in the overlap area D between adjacent printing element substrates, print position displacement of a dot occurs as compared with other areas.

FIG. 11A illustrates the case where the print position displacement does not occur, whereas FIG. 11B illustrates the case where the print position displacement dl occurs. In the case where the print position displacement does not occur, as seen in FIG. 11A, even in the overlap area D, nearly the same dot arrangement state as those in the areas other than the overlap area can be obtained. However, in the case where the print position displacement occurs, as seen in FIG. 11B, the dot arrangement state is disordered. As a result, as compared with the areas other than the overlap area D, the overlap area D has a small coverage area and thereby reduced optical density, and when visually observed, density unevenness is perceived. Further, when each color ink has such density unevenness, color unevenness is perceived. Since it is known that such density unevenness or color unevenness occurs in the overlap area D between adjacent printing element substrates, in the case of a full-line type inkjet printing apparatus, the position of the occurrence can be estimated.

Figure 12:
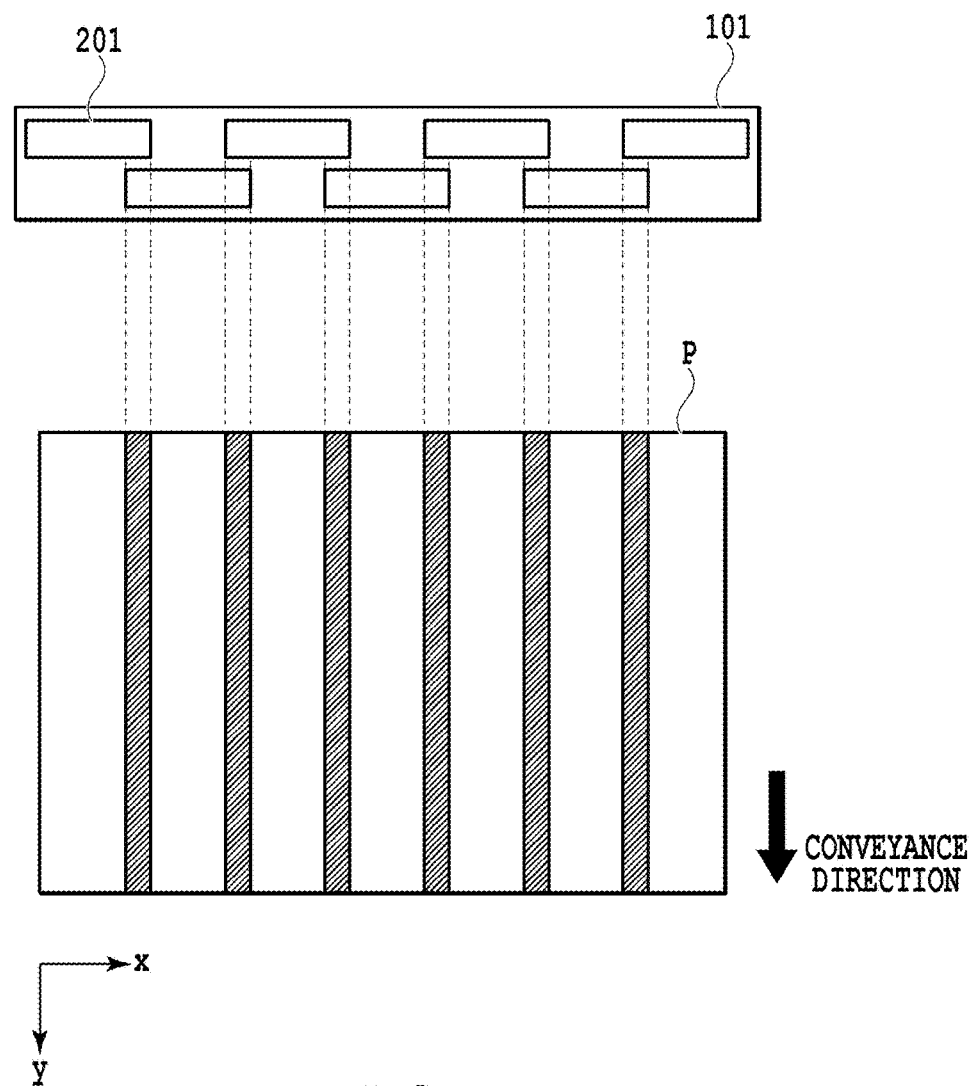
FIG. 12 is a diagram illustrating the occurrence positions of density unevenness.

FIG. 12 is a diagram illustrating the position of the occurrence of density unevenness as described above. The density unevenness appears in positions corresponding to the overlap areas D of the printing element substrates with a constant period in the X direction. The present inventors has determined that in consideration of such a situation, in order to efficiently perform the unique portion detecting algorithm, it is effective to optimize the division size and the phase used for the actual algorithm for each of an overlap area and an area other than the overlap area. Specifically, for the overlap area where density unevenness is likely to particularly appear, a division size and a phase allowing extracting sensitivity for density unevenness to be enhanced are set, whereas for the area other than the overlap area, a division size and a phase allowing, without limitation to density unevenness, various defects in an image to be extracted are set.

Figure 13:
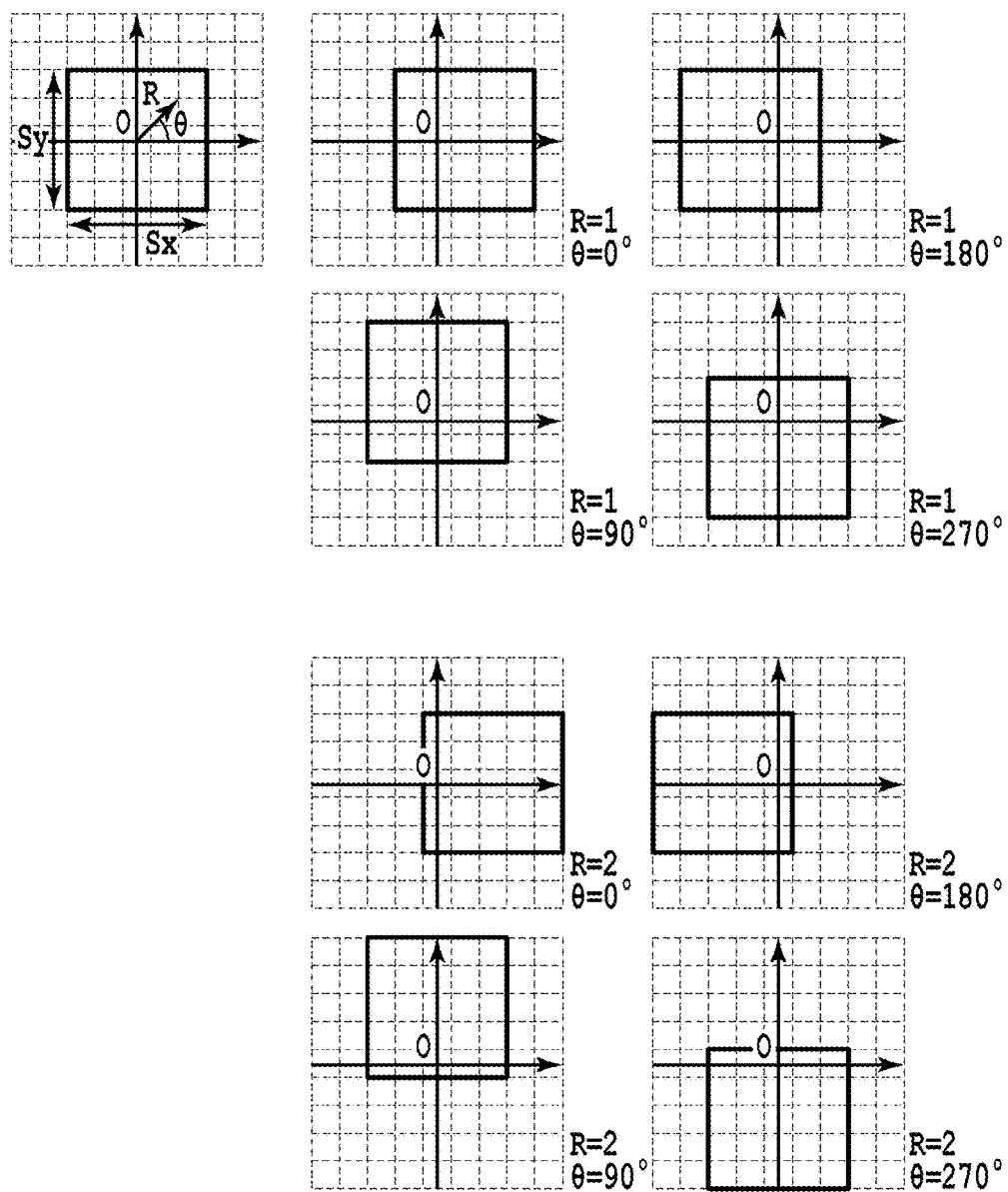
FIG. 13 is a diagram illustrating setting forms of a phase corresponding to a division size.

FIG. 13 is a diagram illustrating setting forms of a phase corresponding to a division size in the present embodiment. The diagram illustrates various phases at the time of setting the division size to Sx×Sy=5×5 pixels. The phase is determined by a movement direction θ and a movement distance R from a reference position O, and in the unique portion detecting algorithm described with FIG. 6, the averaging process is performed within a division area in respective phases, and the resulting quantized values are added.

In the present embodiment, under the condition that the division area is square-shaped (S×S), multiple different division sizes S, movement directions θ, and movement distances R are set in Step S3 of the flowchart in FIG. 5. When doing this, for the area other than the overlap area, the following settings are made:
Division sizes S={2, 4, 8, 16, 32},
Movement directions θ={0°, 90°, 180°, 270°}, and
Movement distances R={0, 2, 4, 6}.

For this reason, in the unique portion detecting algorithm, the averaging and quantization processes are performed for combinations of S, θ, and R meeting R<S, and on the basis of the resulting results, the unique portion extracting process is performed.

On the other hand, for the overlap area, in order to surely detect density unevenness appearing in the overlap area having a width D, the relationship between the division size S and the width D is limited to S D. This is because there is the possibility that if the division size S is made larger than the width D, even in the case where a target pixel is within a density unevenness area, a substantial difference in luminance value after the averaging process cannot be obtained between the target pixel and any of peripheral pixels, and therefore a defect portion cannot be extracted as a unique portion. For this reason, the division size S is limited to the following two different sizes:
Division sizes S={2, 4}.

Figure 14:
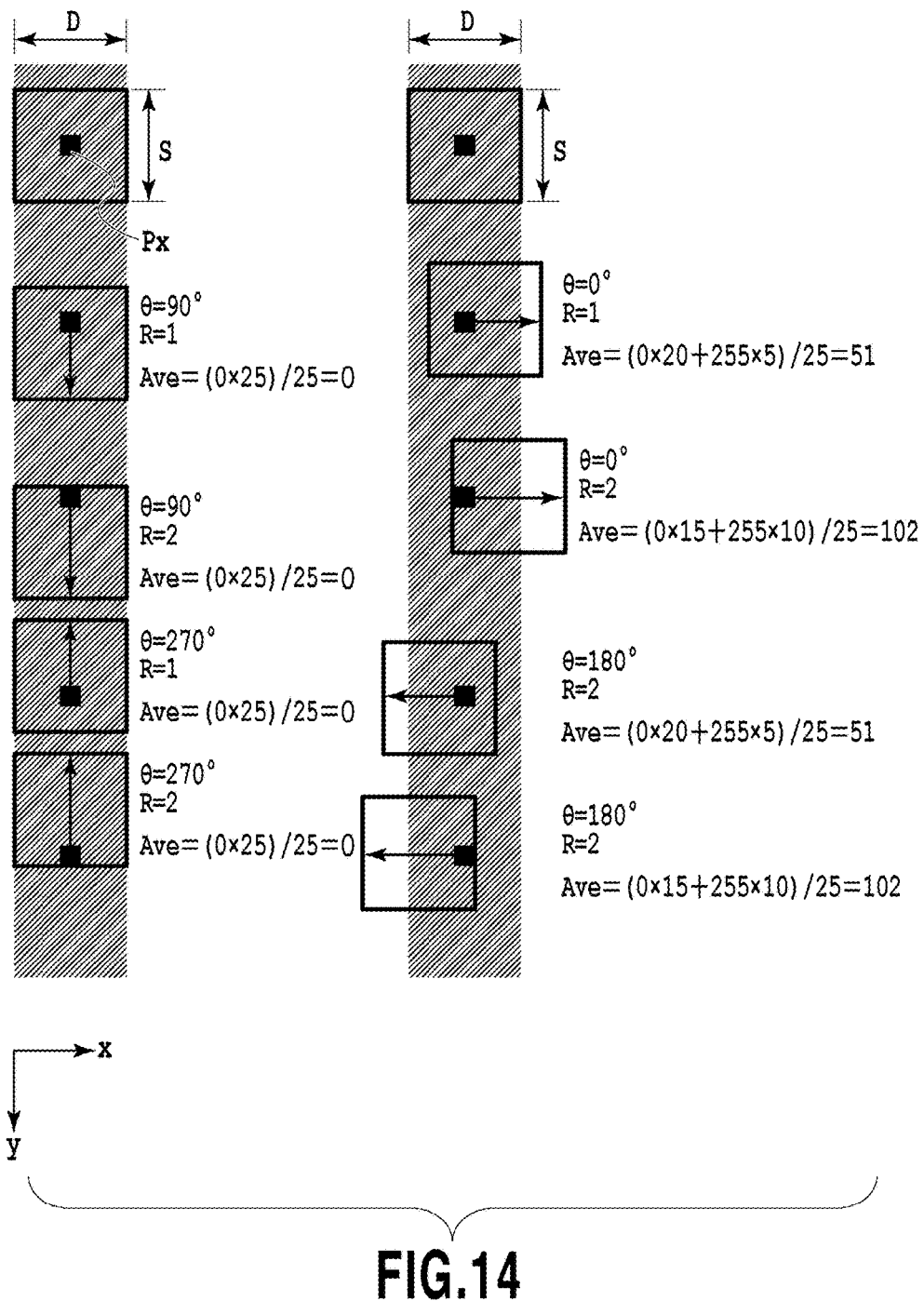
FIG. 14 is a diagram illustrating the relationship between a movement direction and an averaging process result with respect to a target pixel.

Also, the movement direction θ is limited only to the Y direction parallel to a density unevenness area, and it is adapted to prevent noise caused by the other areas. FIG. 14 is a diagram illustrating the relationship between the movement direction θ and an averaging process result in the unique portion detecting algorithm with respect to a target pixel Px included in a density unevenness area. For simplicity of description here, the width D of the density unevenness area and the division size S are set as D=S=5 pixels, and a luminance signal obtained from a read pixel included in the density unevenness area is indicated as 0, whereas luminance signals from the other areas are indicated as 255.

When the movement direction θ is parallel to the Y direction, i.e., 90° or 270°, among the 25 pixels included in the division area, the number of pixels having a luminance signal of 0 and the number of pixels having a luminance signal of 255 are respectively constant regardless of the movement distance R, and values after the averaging process are also constant. On the other hand, when the movement direction is parallel to the X direction, i.e., 0° or 180°, among the 25 pixels included in the division area, the number of pixels having a luminance signal of 0 and the number of pixels having a luminance signal of 255 change depending on the movement distance R, and values after the averaging process are also different depending on the movement distance R. That is, in the case where the movement direction θ of the division area is 0° or 180°, as compared with the case where the movement direction θ is 90° or 270°, the ratio of pixels not positioned in the density unevenness area changes depending on the movement distance R, and a value after the averaging process is also affected by an area other than the density unevenness area. As a result, detection sensitivity for the density unevenness itself is reduced.

Accordingly, in the present embodiment, in a position where density unevenness is likely to appear, in order to surely extract the density unevenness, the movement direction θ is set to only 90° and 270°. That is, in Step S3 of the flowchart in FIG. 5, for the overlap area, the CPU 301 sets
Division sizes S={2, 4},
Movement directions θ={90°, 270°}, and
Movement distances R={0, 2}.

Note that in the above, as compared with the ranges of the division size S, movement direction θ, and movement distance R set for the area other than the overlap area, for the overlap area, the ranges of the division size and the movement direction θ are both limited. However, even a form adapted to limit only one of the ranges of the division size and the movement direction also makes it possible to obtain the effect of the present embodiment. Specifically, for the area other than the overlap area, it may be adapted to set
Division sizes S={2, 4, 8, 16, 32},
Movement directions θ={0°, 90°, 180°, 270°}, and
Movement distances R={0, 2, 4, 6}, whereas for the overlap area, it may be adapted to set
Division sizes S={2, 4},
Movement directions θ={0°, 90°, 180°, 270°}, and
Movement distances R={0, 2}, or
Division sizes S={2, 4, 8, 16, 32},
Movement directions θ={90°, 270°}, and
Movement distances R={0, 2, 4, 6}.

Further, while the division size S is fixed to one common size for the overlap area and the area other than the overlap area, it is possible that phases (movement directions θ and movement distances R) are set for the overlap area and the area other than the overlap area independently. Conversely, while the phase is fixed as θ=0° and R=0, it is possible that the division size S are set for the overlap area and the area other than the overlap area independently.

In any way, it is possible to suppress the effect of the area other than the density unevenness area on a value after the averaging process, and as compared with the case of setting the same parameters as those for the area other than the overlap area, it is possible to enhance the detection sensitivity for density unevenness.

According to the present embodiment described above, the ranges (numbers) of the respective parameters set in Step S3 of the flowchart in FIG. 5 are optimized for each of the area other than the overlap area and the overlap area. In doing so, in the overlap area where density unevenness is likely to appear, the density unevenness can be surely extracted, whereas in the area other than the overlap area, various defects can be extracted.

Second Embodiment

In the first embodiment, as described with the flowchart illustrated in FIG. 6, the process adapted to obtain an addition result of average values in multiple phases corresponding to a division size is performed. Meanwhile, as described using FIGS. 8A to 9J, such a process finally results in a filtering process with a target pixel as the center. In consideration of such a point, the present embodiment is adapted to replace the addition process performed in multiple phases corresponding to a fixed division size by an addition process performed using weighting coefficients derived from a Gaussian filter.

Figure 15A:
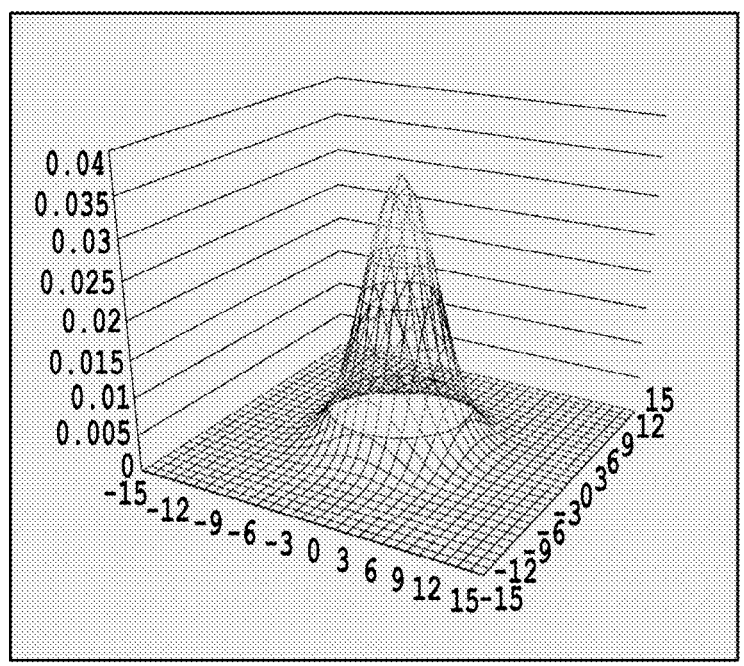
FIGS. 15A and 15B are diagrams illustrating examples of a Gaussian filter.
Figure 15B:
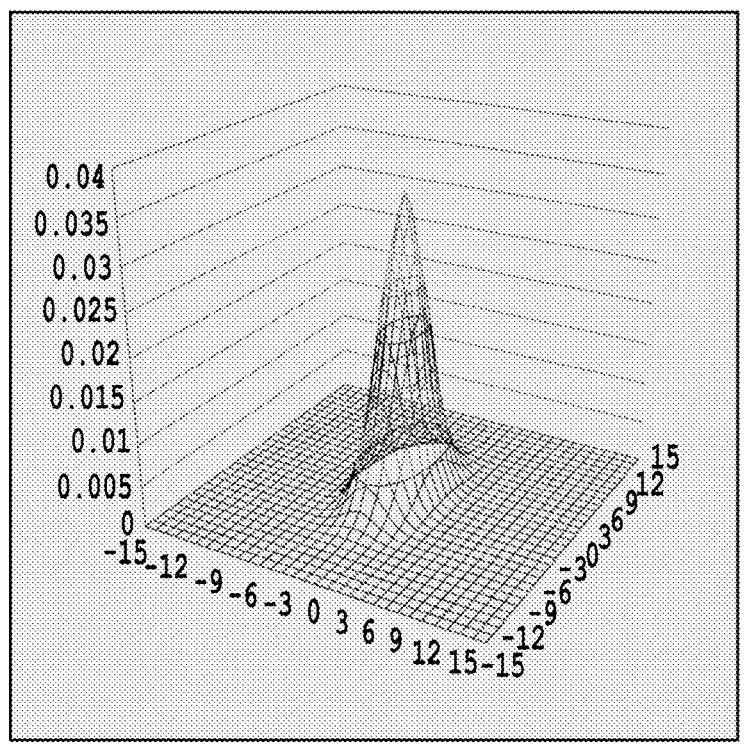

FIGS. 15A and 15B are diagrams illustrating examples of the Gaussian filter. FIG. 15A illustrates an isotropic Gaussian filter, which can be expressed by Expression (1).

$$f(x, y) = \frac{1}{2\pi\sigma^2} \exp\left(-\frac{x^2 + y^2}{2\sigma^2}\right) \quad (1)$$

Here, σ represents a standard deviation.

Such an isotropic Gaussian filter corresponds to, in the first embodiment, the case of using a square division size such as 2×2 or 3×3. On the other hand, FIG. 15B illustrates an anisotropic Gaussian filter, and corresponds to, in the first embodiment, the case of using a rectangular division size such as 2×3. Such an anisotropic Gaussian filter can be generated by deviating the ratio between x and y in Expression (1). For example, FIG. 15B corresponds to a Gaussian filter generated by replacing x in Expression (1) by x'=x/2. The present embodiment can employ any of the Gaussian filters.

For example, the Gaussian filter in FIG. 15A represents coefficients of respective pixels positioned within the ranges of −15≤X≤15 and −15≤Y≤15 with a target pixel as the origin. A form adapted to set the coefficients within the ranges of −15≤X≤15 and −15≤Y≤15 as described is similar to a state in the first embodiment where the division size is set to 8×8, and the addition process as illustrated in FIGS. 8A to 9J is performed. Given here that the size of the Gaussian filter is represented by F×F, and the division size in the first embodiment is represented by S×S, the size F can be expressed by F≈2S−1. In addition, by adjusting the Gaussian filter size F as well as the standard deviation σ, Gaussian filters having various sizes can be prepared. The present embodiment is adapted to obtain results of respectively using multiple Gaussian filters having different sizes to perform a filtering process on luminance data of a target pixel and further performing quantization, and add the results. In doing so, a unique portion extracting process can be performed on the basis of the addition result equivalent to that in the first embodiment.

Figure 16:
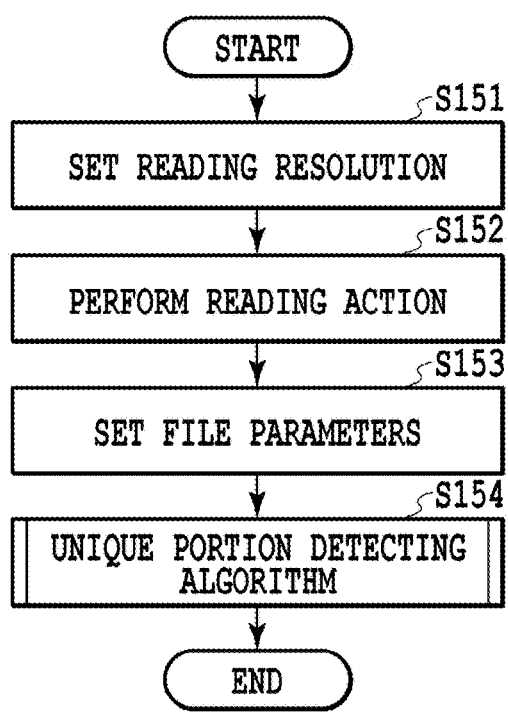
FIG. 16 is a flowchart illustrating the basic steps for unique portion detection in a second embodiment.

FIG. 16 is a flowchart for explaining the basic steps for unique portion detection performed by the image processing apparatus 1 of the present embodiment. When this process is started, the image processing apparatus 1 sets a reading resolution in Step S151, and in subsequent Step S152, performs a reading action on an inspection target. Steps S151 and S152 described above are equivalent to Steps S1 and S2 of FIG. 5.

In Step S153, the CPU 301 sets multiple different file parameters of a Gaussian filter used for the unique portion detecting algorithm to be performed in subsequent Step S154. The file parameters refer to parameters for designating the directionality of a Gaussian function as described with FIG. 15A or 15B, and a different filter size F and standard deviation σ. Then, in Step S154, on the basis of the file parameters set in Step S153, the predetermined unique portion detecting algorithm is performed on image data generated in Step S152.

Figure 17:
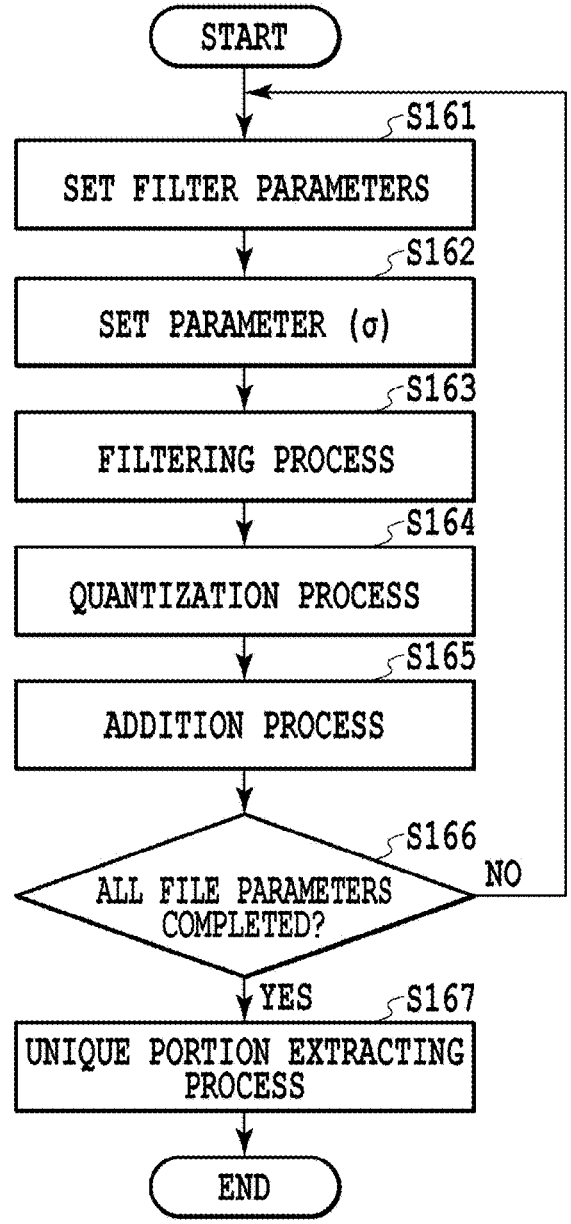
FIG. 17 is a flowchart illustrating a unique portion detecting algorithm in the second embodiment.

FIG. 17 is a flowchart for explaining the steps of the unique portion detecting algorithm performed by the CPU 301 in Step S154. The process illustrated in FIG. 17 is performed one-by-one on pixels of an image acquired in Step S152.

When this process is started, in Step S161, the CPU 301 first sets one file parameter from among the multiple file parameters set in Step S153. Further, in Step S162, the CPU 301 sets a parameter σ corresponding to the file parameter set in Step S161. The parameter σ corresponds to the standard deviation of a Gaussian function, and is assumed to be preliminarily stored in a memory related to the file parameter and/or a filter size. Setting the file parameter and the parameter σ in Steps S161 and S162 determines the shape of a Gaussian filter.

In subsequent Step S163, the Gaussian filter set in Steps S161 and S162 is used to perform a filtering process on the image data acquired in Step S152. Specifically, pieces of luminance data of the target pixel and peripheral pixels falling within the filter size F are multiplied by coefficients determined by the Gaussian filter, and the sum of the pieces of luminance data multiplied by the coefficients is calculated as a filtering process value for the target pixel.

In Step S164, a quantization process is performed on the filtering process value obtained in Step S163, and further, in Step S165, a quantized value obtained in Step S164 is added to addition image data. The addition image data refers to image data for obtaining a result of adding pieces of quantized data obtained by variously changing the file parameter, i.e., variously changing the type of a Gaussian filter. When the quantized data obtained in Step S164 corresponds to a result obtained using the initial Gaussian filter, the addition image data is the same as the quantized data obtained in Step S164.

In subsequent Step S166, the image processing apparatus 1 determines whether or not all the file parameters set in Step S153 have been processed. When the image processing apparatus 1 determines that a file parameter to be processed still remains, the flow returns to Step S161, where the next file parameter is set. On the other hand, when the image processing apparatus 1 determines that all the file parameters have been processed, the flow proceeds to Step S167.

In Step S167, on the basis of currently obtained addition image data, the unique portion extracting process is performed. An extracting method is not particularly limited as in the first embodiment. This process ends here.

As with the first embodiment, the present embodiment also makes it possible to surely extract a density unevenness in an overlap area, and at the same time, in an area other than the overlap area, without limitation to a density unevenness, extract various unique portions. For this purpose, in Step S153 of FIG. 16, different file parameters are prepared between the overlap area and the area other than the overlap area. For example, for the area other than the overlap area, an isotropic Gaussian filter as illustrated in FIG. 15A is prepared. On the other hand, for the overlap area, an anisotropic Gaussian filter of which the size in a width direction of a density unevenness is suppressed as illustrated in FIG. 15B is prepared. When attempting to obtain the same effect as that of the first embodiment adapted to place the limitation of S D on a division size S, the X direction size of the Gaussian filter used for the overlap area is preferably equal to or less than twice the width D of the density unevenness.

Figure 18C:
FIGS. 18A to 18C are diagrams illustrating a processing result of the unique portion detecting algorithm.
Figure 18B:
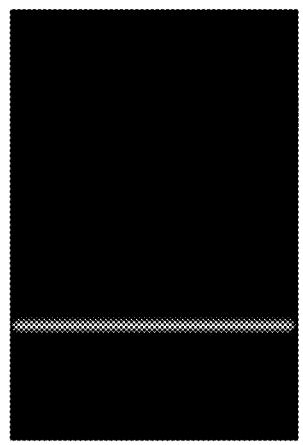
Figure 18A:

FIGS. 18A to 18C are diagrams for explaining a result of performing the unique portion detecting algorithm in the present embodiment on a set inspection target area. FIG. 18A illustrates inspection target image data. FIG. 18B illustrates a result of processing the inspection target image illustrated in FIG. 18A using a Gaussian filter having filter sizes of Fx=Fy=30 and a standard deviation of σ=3. It turns out that the entire image including a density unevenness area is blurred. Further, FIG. 18C illustrates a result of performing the flowchart described with FIG. 17. Specifically, FIG. 18C illustrates a result of, in Step S165, adding results obtained when setting σ=1, 2, and 3 in Step S161, and in Step S167, binarizing a result of the addition. It turns out that a place where the density unevenness appears in FIG. 18A is further emphasized and appropriately extracted.

As described above, the present embodiment is adapted to prepare a Gaussian filter of which file parameters are set so as to enhance sensitivity for a unique portion to be extracted, independently of a Gaussian filter used for the other area. In doing so, as with the first embodiment, the unique portion to be extracted can be efficiently extracted while avoiding the extraction of noise that does not matter so much.

Other Embodiments

In the above-described embodiments, the description is given with density unevenness in an overlap area as an extraction target. However, the present invention can also set various image defects as extraction targets. For example, when an ejection failure printing element is present among the multiple printing elements, a white stripe extending in the Y direction and having one pixel width appears in an image. However, specifying the position of the appearance of such a white stripe is impossible, differently from the above-described density unevenness. Accordingly, when enhancing extraction sensitivity for a white stripe caused by ejection failure, it is preferable to decrease the size of a division area and/or the magnitude of a phase over the entire image area, and limit a direction of the phase to the Y direction (90° or 270°) in which the white stripe extends.

In addition, in a case where the presence of an ejection failure has been confirmed the present invention is effective for determining whether a white stripe caused by the ejection failure becomes a defect in an actual image or not. In this case, it is only necessary to set the division size, the phase or the file parameter such that the extraction sensitivity for a white stripe caused by ejection failure is to be enhanced.

Figure 19:
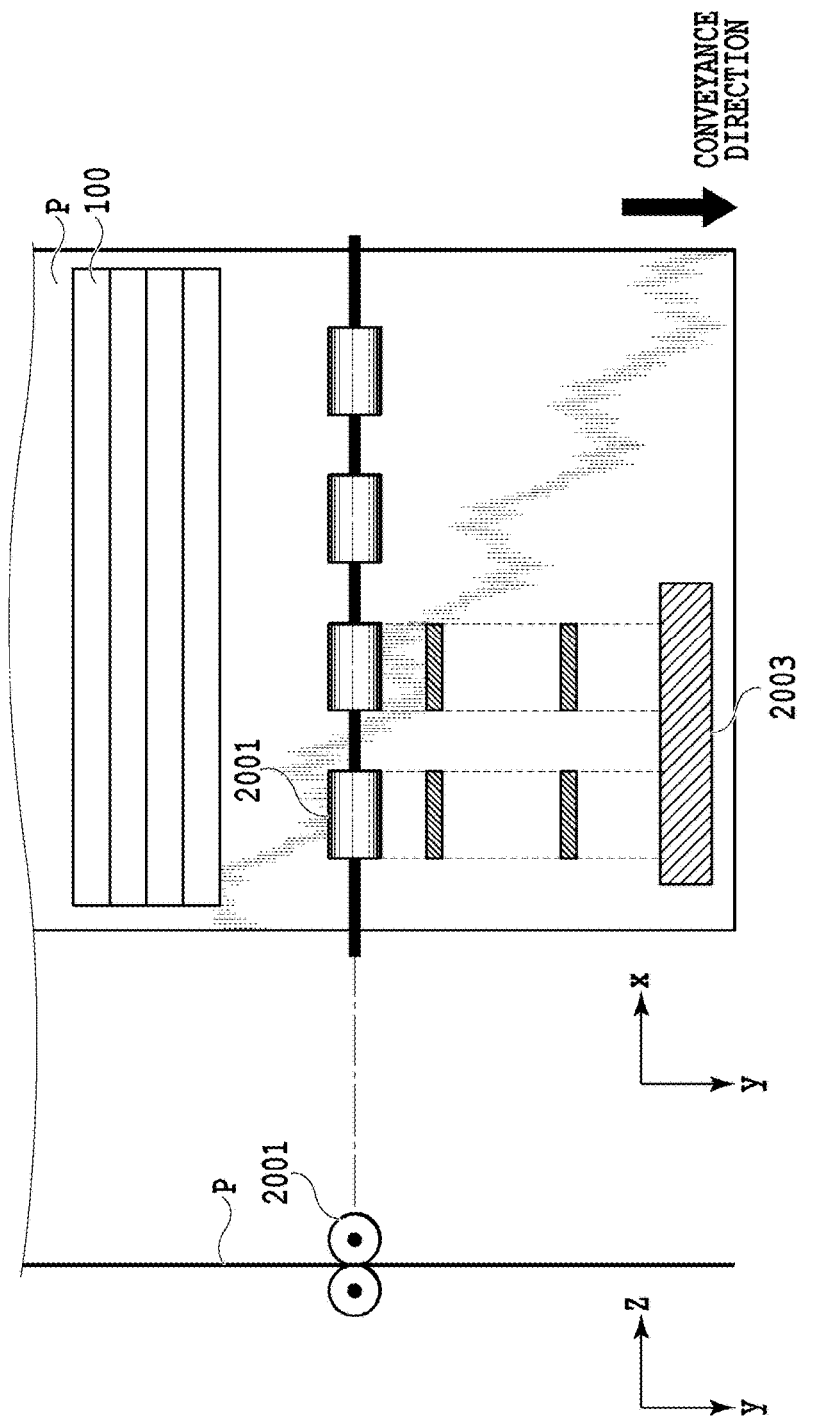
FIG. 19 is a diagram for explaining retransferring from a discharge roller.

Also, in the case of an inkjet printing apparatus, image stains may occur due to retransferring from a discharge roller adapted to discharge a printed sheet. Referring to FIG. 19, when the print head 100 prints an image 2003 having a large ink application amount, sometimes ink that cannot be absorbed by a sheet P is transferred to a discharge roller 2001 once, and the transferred ink is further retransferred to another area of the sheet P. Such a stain extends as a higher density area than the other area in a direction in which the discharge roller 2001 is arranged, i.e., in the X direction, and appears periodically along with the rotation of the discharge roller. Specifying the appearance position of such image defects is impossible like a white stripe. However, when desiring to extract these image defects, it is preferable to set somewhat large division size and phase, and limit a direction of the phase to the X direction (0° or 180°).

Further, in order to extract each of density unevenness in an overlap area as described in the above embodiments, a white stripe caused by ejection failure, and density unevenness caused by retransferring, it is also preferable to adjust threshold values used when performing the quantization process in Step S14 or S164.

Figure 20:
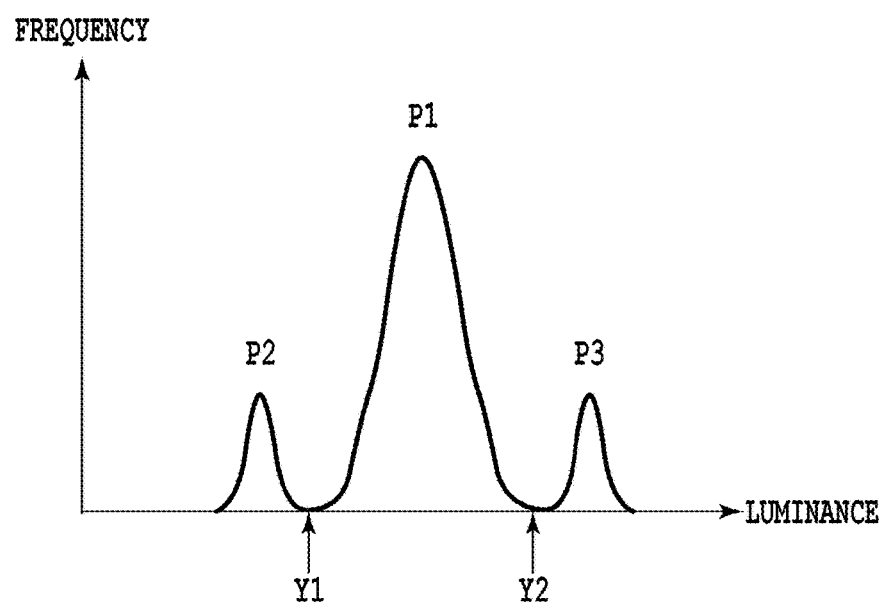
FIG. 20 is a diagram illustrating a luminance histogram of a read image.

FIG. 20 is a diagram illustrating a luminance histogram obtained when using the scanner 107 to read an image in which both of a white stripe and a retransferred area are present in a uniform gray tone. In the histogram of the gray tone image having a peak P1, a result of reading the retransferred area having a luminance value peak P2 lower than P1, and a result of reading the white stripe having a high luminance value peak P3 appear. As described, in the case where a peak in a histogram is clearly different between extraction targets, it is preferable to, as threshold values used when performing the quantization process, use luminance values (Y1 and Y2) making it possible to separate the extraction targets (P2 and P3) from the actual image P1

Other Embodiments

Further, embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132748, filed Jul. 1, 2015, which is hereby incorporated by reference wherein in its entirety.

What is claimed is:

1. An image processing apparatus adapted to inspect an image, the image processing apparatus comprising:
    an acquisition unit configured to acquire image data obtained by reading the image;
    a setting unit configured to set a division way for dividing the image data;
    a processing unit configured to divide the image data in accordance with the division way set by the setting unit, and perform a predetermined process on each of resulting division areas; and
    an extracting unit configured to extract a unique portion caused by a device to print the image from image data resulting from performing the predetermined process,
wherein:
    the predetermined process includes
    an averaging process on each of division areas obtained by dividing the image data in accordance with the division way set by the setting unit,
    a quantization process for quantizing values obtained by the averaging process, and an addition process for adding values obtained by differentiating the division way of the image data in the averaging process and performing the quantization process, and the setting unit sets a first division way for the predetermined process for a first area that is associated with the device in occurrence position of the unique portion and a second division way for a second area other than the first area.

2. The image processing apparatus according to claim 1, wherein:

The setting unit sets at least one of division size and phase as the division way for dividing the image data.

3. The image processing apparatus according to claim 2, wherein:

the setting unit sets a first division size as the first division way and a second division size different from the first division size as the second division way.

4. The image processing apparatus according to claim 3, wherein:

the setting unit sets the first division size within a range equal to or less than a size of the unique portion, and sets the second division size within the range equal to or less than the size of the unique portion and within a range equal to or more than the size of the unique portion.

5. The image processing apparatus according to claim 2, wherein:

the setting unit sets a first phase as the first division way and a second phase different from the first phase as the second division way.

6. The image processing apparatus according to claim 5, wherein:

the setting unit sets the first phase for a direction in which the unique portion extends, and sets the second phase for a direction different from the direction in which the unique portion extends.

7. The image processing apparatus according to claim 1, wherein:

the device is an inkjet printing apparatus; and
the unique portion corresponds to an overlap area of arranging of a plurality of print element substrates in which printing elements for ejecting ink are arrayed in the device.

8. The image processing apparatus according to claim 1, wherein:

the device is an inkjet printing apparatus; and
the unique portion is a white stripe caused by an ejection failure that has been already detected among print elements for ejecting ink.

9. The image processing apparatus according to claim 1 further comprising:

a printing unit configured to print the image.

10. The image processing apparatus according to claim 9 further comprising:

a unit configured to perform a maintenance process on the printing unit depending on whether or not a unique portion is extracted by the extracting unit.

11. The image processing apparatus according to claim 1, wherein:

the extracting unit performs a popup process for making a position of the unique portion apparent.

12. The image processing apparatus according to claim 1, further comprising:

a unit configured to store a position of the unique portion extracted by the extracting unit, and generate an image processing parameter for correcting the unique portion.

13. The image processing apparatus according to claim 1, further comprising:

a unit configured to, when the extracting unit extracts the unique portion, notify presence of the unique portion.

14. An image processing apparatus adapted to inspect an image, the image processing apparatus comprising:

an acquisition unit configured to acquire image data obtained by reading the image;

a setting unit configured to set a file parameter for performing a filtering process on the image data;

a processing unit configured to perform a predetermined process on the image data in accordance with the file parameter set by the setting unit; and an extracting unit configured to extract a unique portion caused by a device to print the image from image data resulting from performing the predetermined process, wherein:

the predetermined process includes the filtering process in accordance with the file parameter set by the setting unit, a quantization process for quantizing values obtained by the filtering process, and an addition process for adding values obtained by differentiating the file parameter in the filtering process and performing the quantization process, and the setting unit sets a first file parameter for the predetermined process for a first area that is associated with the device in occurrence position of the unique portion and a second file parameter for a second area other than the first area independently.

15. The image processing apparatus according to claim 14, wherein:

the setting unit sets the first filter size as the first file parameter and sets a second filter size as the second file parameter for the filtering process, and the first filter size is set to be equal to or less than twice a size of the unique portion.

16. The image processing apparatus according to claim 14, wherein:

the device is an inkjet printing apparatus; and
the unique portion corresponds to an overlap area of arranging of a plurality of print element substrates in which printing elements for ejecting ink are arrayed in the device.

17. The image processing apparatus according to claim 14, wherein:

the device is an inkjet printing apparatus; and
the unique portion is a white stripe caused by an ejection failure that has been already detected among print elements for ejecting ink.

18. An image processing method adapted to inspect an image, the image processing method comprising:

an acquisition step of acquiring image data obtained by reading the image;

a setting step of setting a division way for dividing the image data;

a processing step of dividing the image data in accordance with the division way set in the setting step, and performing a predetermined process on each of resulting division areas; and an extracting step of extracting a unique portion caused by a device to print the image from image data resulting from performing the predetermined process, wherein:

the predetermined process includes an averaging process on each of division areas obtained by dividing the image data in accordance with the division way set by the setting step, a quantization process for quantizing values obtained by the averaging process, and an addition process for adding values obtained by differentiating the division way of the image data in the averaging process and performing the quantization process, and in the setting step, a first division way for the predetermined process for a first area that is associated with the device in occurrence position of the unique portion and a second division way for a second area other than the first area are set independently.

19. An image processing method adapted to inspect an image, the image processing method comprising:

an acquisition step of acquiring image data obtained by reading the image;

a setting step of setting a file parameter for performing a filtering process on the image data;

a processing step of performing a predetermined process on the image data in accordance with the file parameter set in the setting step; and an extracting step of extracting a unique portion caused by a device to print the image from image data resulting from performing the predetermined process, wherein:

the predetermined process includes the filtering process in accordance with the file parameter set by the setting step, a quantization process for quantizing values obtained by the filtering process, and an addition process for adding values obtained by differentiating the file parameter in the filtering process and performing the quantization process, and in the setting step, a first file parameter for the predetermined process for a first area that is associated with the device in occurrence position of the unique portion and a second file parameter for a second area other than the first area are set independently.

* * * * *